US011796231B2

(12) United States Patent
Jang et al.

(10) Patent No.: US 11,796,231 B2
(45) Date of Patent: Oct. 24, 2023

(54) GAS HEAT-PUMP SYSTEM

(71) Applicant: LG ELECTRONICS INC., Seoul (KR)

(72) Inventors: Heejoong Jang, Seoul (KR); Hojong Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 30 days.

(21) Appl. No.: 17/110,609

(22) Filed: Dec. 3, 2020

(65) Prior Publication Data
US 2021/0172656 A1 Jun. 10, 2021

(30) Foreign Application Priority Data
Dec. 6, 2019 (KR) .................. 10-2019-0161649

(51) Int. Cl.
| | | |
|---|---|---|
| F25B 27/00 | (2006.01) | |
| F02B 33/40 | (2006.01) | |
| F02B 39/10 | (2006.01) | |
| F02D 29/04 | (2006.01) | |
| F02M 26/08 | (2016.01) | |
| F02D 23/00 | (2006.01) | |
| F02B 47/08 | (2006.01) | |

(52) U.S. Cl.
CPC .............. *F25B 27/00* (2013.01); *F02B 33/40* (2013.01); *F02B 39/10* (2013.01); *F02B 47/08* (2013.01); *F02D 23/00* (2013.01); *F02D 29/04* (2013.01); *F02M 26/08* (2016.02)

(58) Field of Classification Search
CPC ........ F02D 29/04; F02D 41/00; F02D 41/005; F02D 41/14; F02D 41/1448; F02D 41/1453; F02D 41/1459; F02D 41/1461; F02D 2200/0406; F02B 33/40; F02B 37/10; F02B 37/18; F02B 2037/122; F02B 39/10; F02M 26/08
See application file for complete search history.

(56) References Cited

U.S. PATENT DOCUMENTS

| | | | |
|---|---|---|---|
| 2006/0037347 A1* | 2/2006 | Kang | ...................... F25D 21/04 62/323.3 |
| 2012/0055153 A1* | 3/2012 | Murata | ................. F01K 23/065 60/602 |
| 2013/0081391 A1* | 4/2013 | Vijayaraghavan | ........................... F02D 41/0007 60/602 |

(Continued)

FOREIGN PATENT DOCUMENTS

| | | | |
|---|---|---|---|
| JP | 2004085091 A | * | 3/2004 |
| KR | 10-2005093 | | 7/2019 |

OTHER PUBLICATIONS

JP 2004 085091 English Translation.*

*Primary Examiner* — John Kwon
*Assistant Examiner* — Johnny H Hoang
(74) *Attorney, Agent, or Firm* — KED & ASSOCIATES, LLP

(57) ABSTRACT

Proposed is a gas heat-pump system including: a compressor of an air conditioning module; a gas engine generating a drive force of the compressor; and a turbocharger primarily first-level pressure to a fuel-to-air mixture and supplying the fuel-to-air mixture to the gas engine or applying second-level pressure to the fuel-to-air mixture to which the first-level pressure is applied and supplying the fuel-to-air mixture to the gas engine.

21 Claims, 16 Drawing Sheets

(56) References Cited

U.S. PATENT DOCUMENTS

| | | | |
|---|---|---|---|
| 2013/0213363 A1* | 8/2013 | Pruemm | F02D 41/0025 |
| | | | 123/491 |
| 2013/0233288 A1* | 9/2013 | Schnepel | F02G 3/02 |
| | | | 123/528 |
| 2013/0283782 A1* | 10/2013 | McConville | F02D 41/1454 |
| | | | 60/602 |
| 2016/0047298 A1* | 2/2016 | Löfgren | F01N 11/002 |
| | | | 60/273 |
| 2016/0333775 A1* | 11/2016 | Kraemer | F02B 39/10 |
| 2016/0369678 A1* | 12/2016 | Barciela | F01N 3/2073 |
| 2018/0149121 A1* | 5/2018 | Owen | F02B 29/0406 |
| 2019/0078503 A1* | 3/2019 | Klima | F02M 21/0245 |

\* cited by examiner

[FIG. 1]

[FIG. 3]
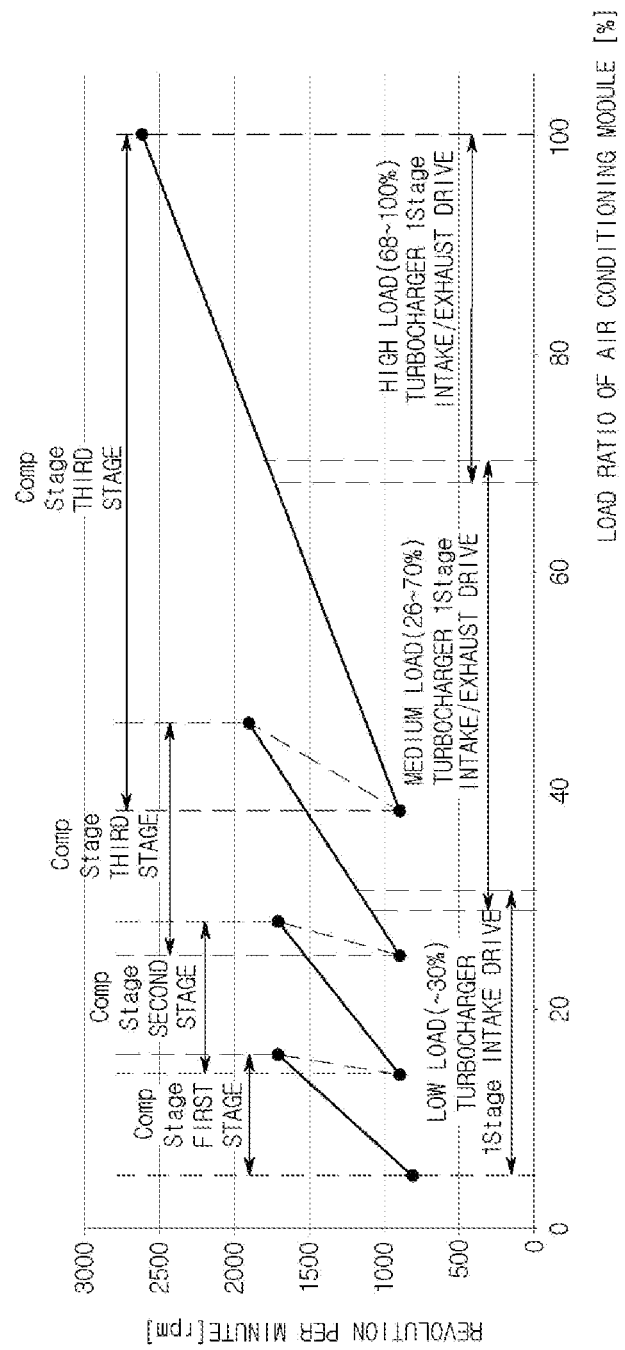

[FIG. 4]

|  | FIRST COMPRESSOR | | SECOND COMPRESSOR | |
|---|---|---|---|---|
|  | FIRST CLUTCH | FIRST CAPACITY VALVE | SECOND CLUTCH | SECOND CAPACITY VALVE |
| FIRST STAGE | ON | PARTLY OPEN | OFF | FULLY OPEN |
| SECOND STAGE | ON | PARTLY OPEN | ON | PARTLY OPEN |
| THIRD STAGE | ON | FULLY OPEN | ON | PARTLY OPEN |
| FOURTH STAGE | ON | FULLY OPEN | ON | FULLY OPEN |

[FIG. 5]
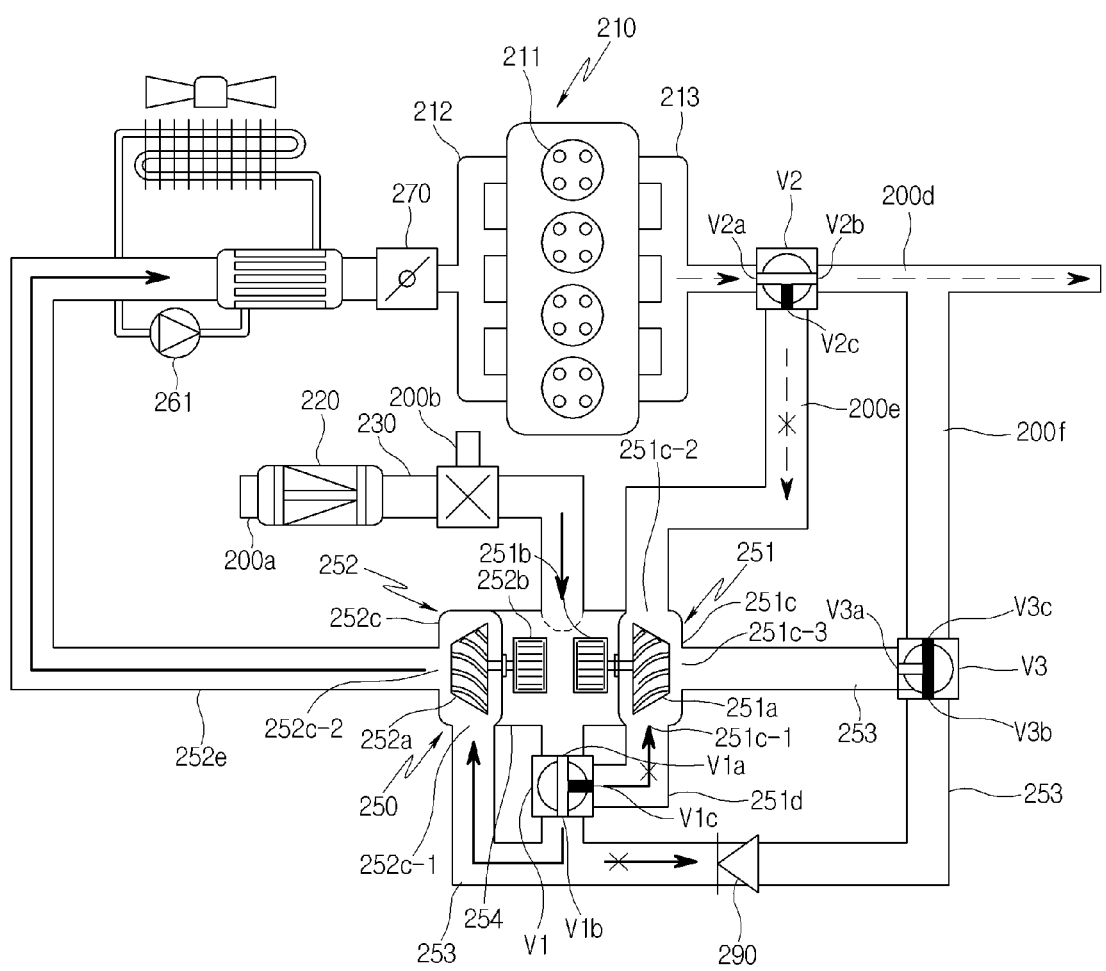

[FIG. 6]
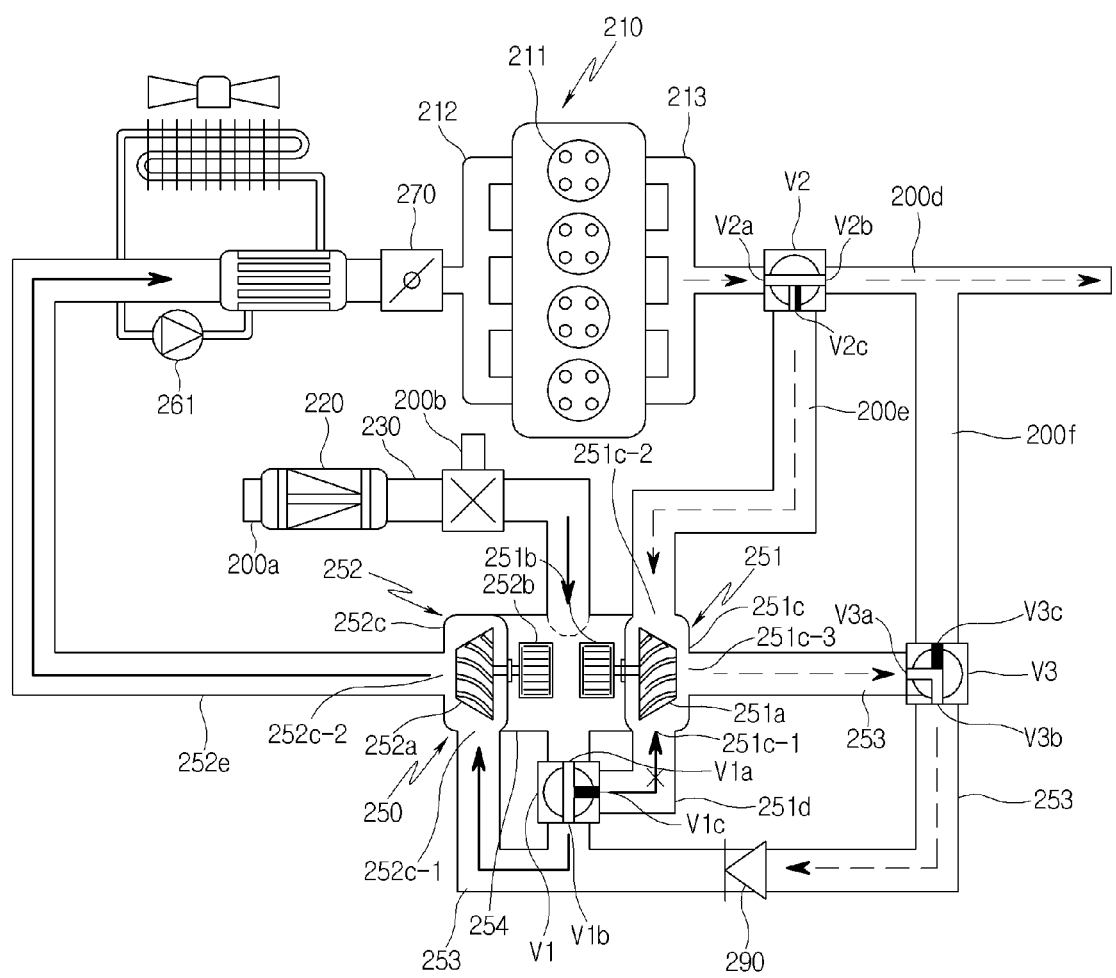

[FIG. 7]
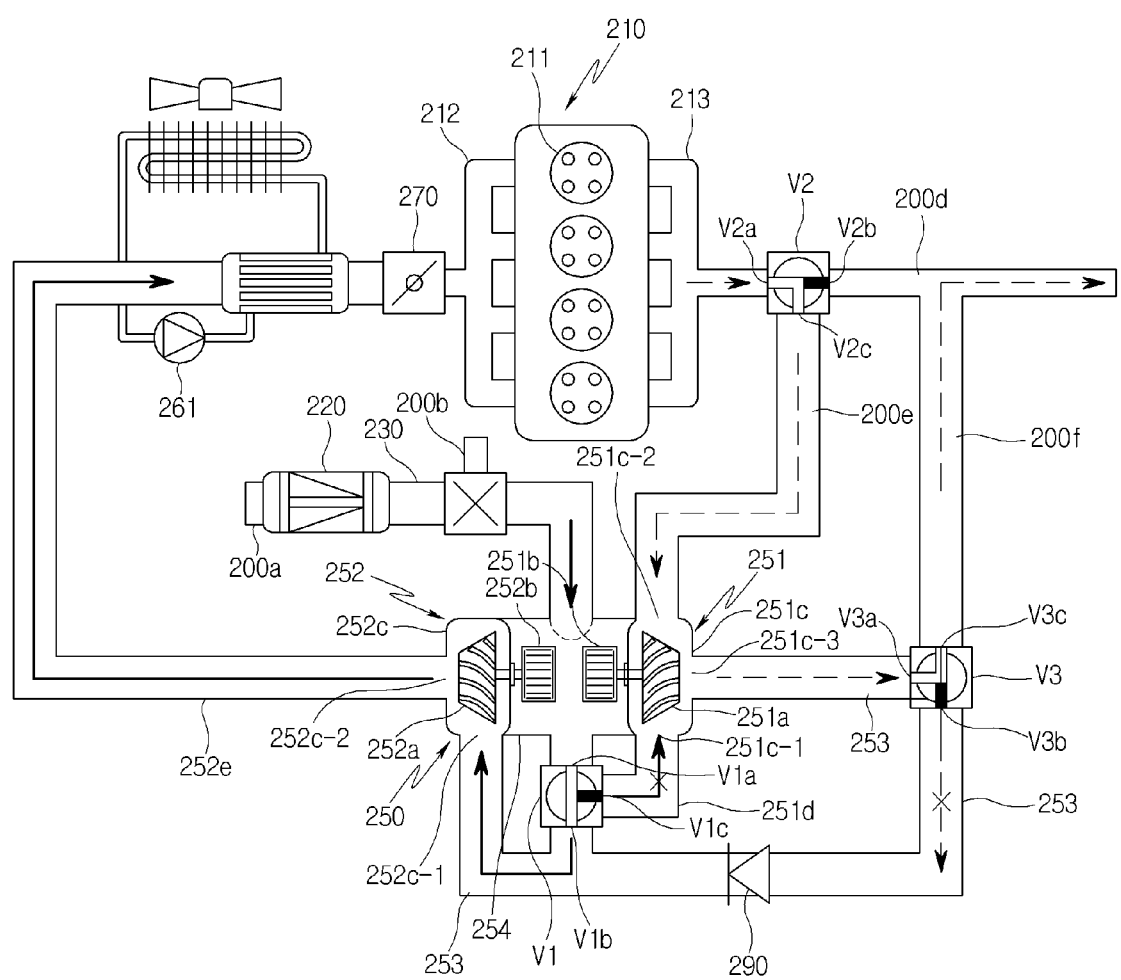

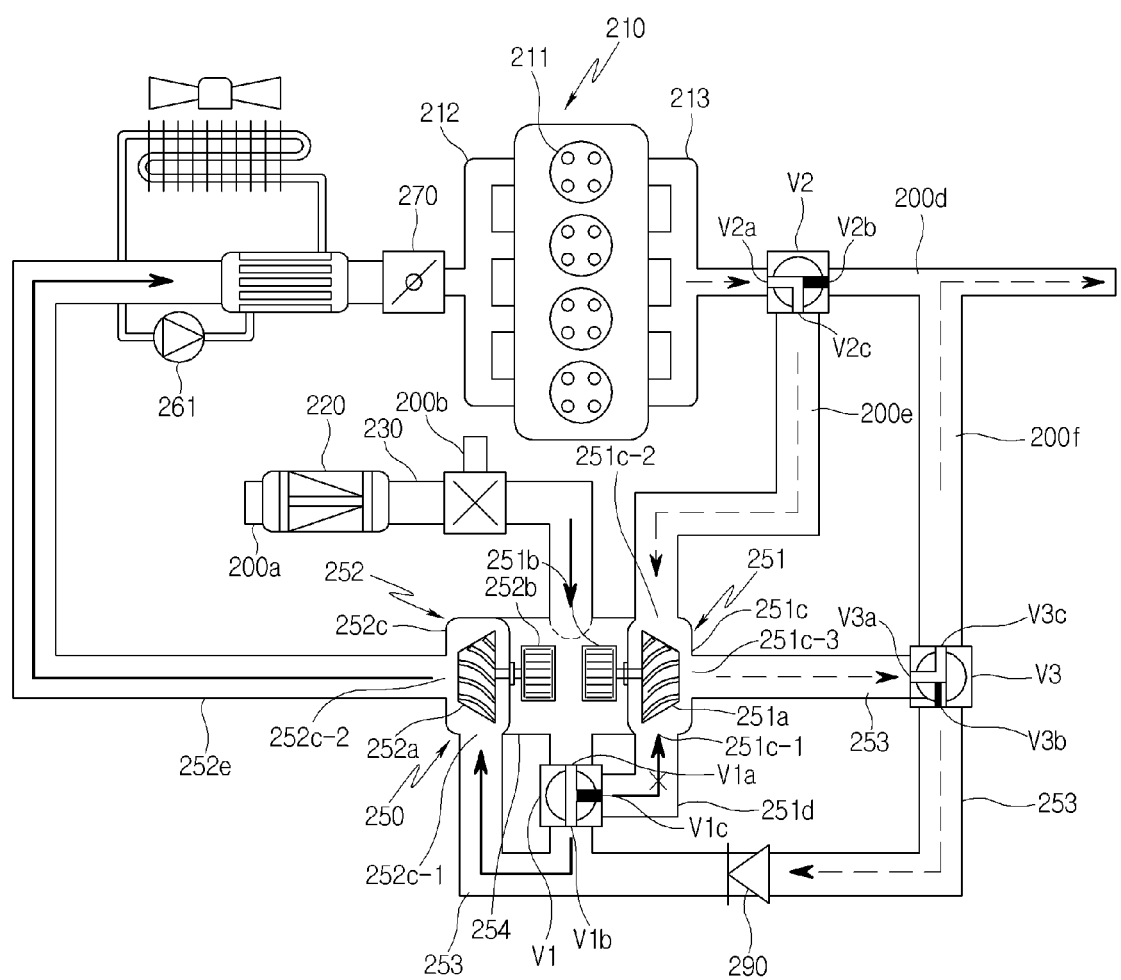
[FIG. 8]

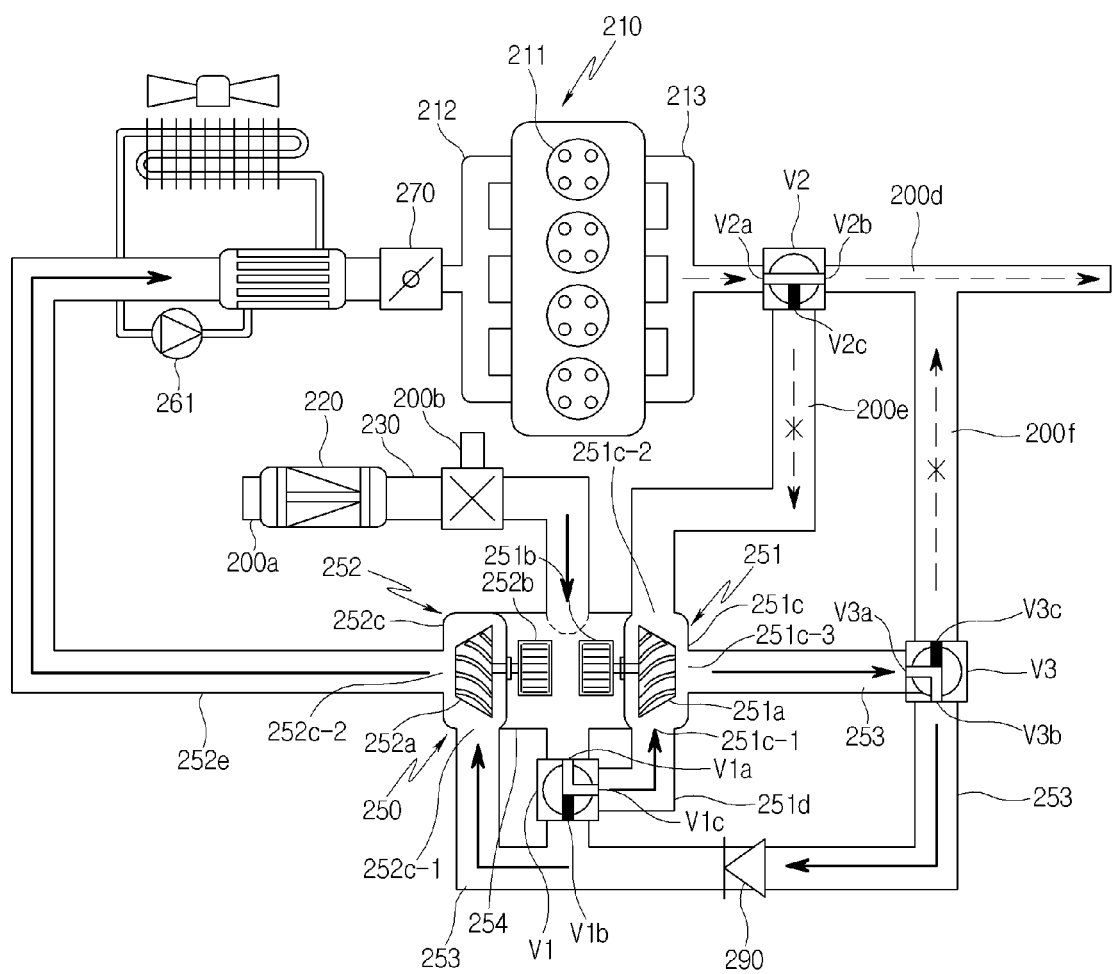
[FIG. 9]

[FIG. 10]
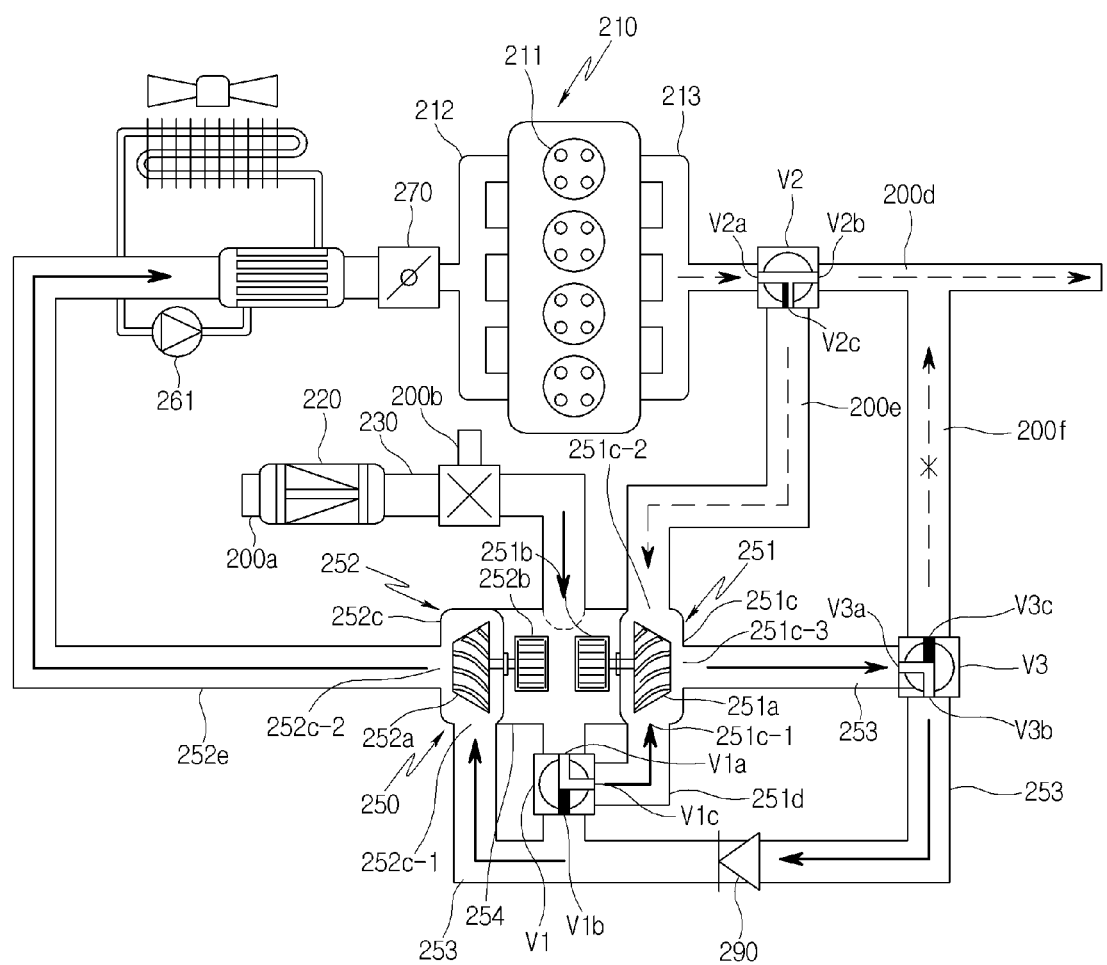

[FIG. 11]
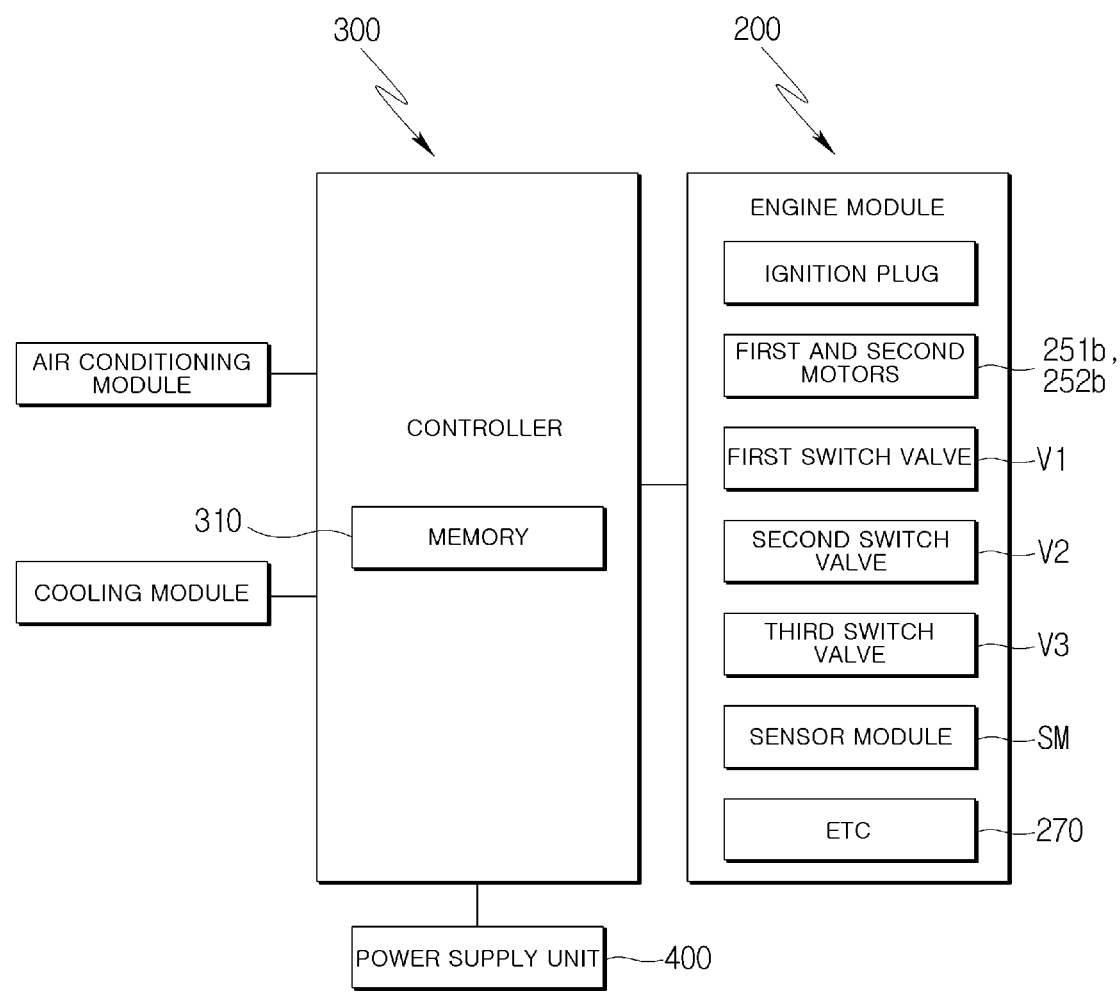

[FIG. 12]
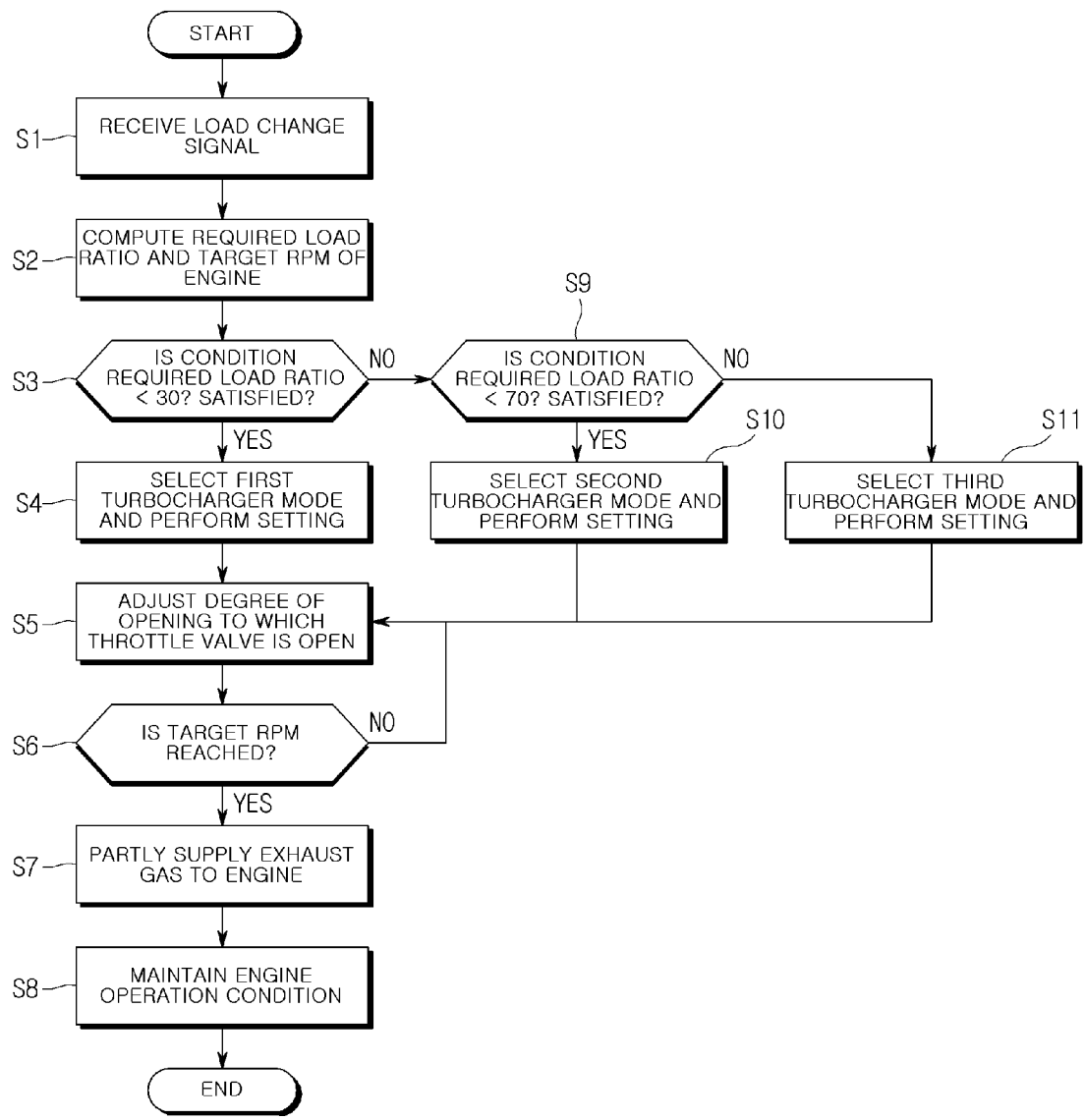

[FIG. 13]
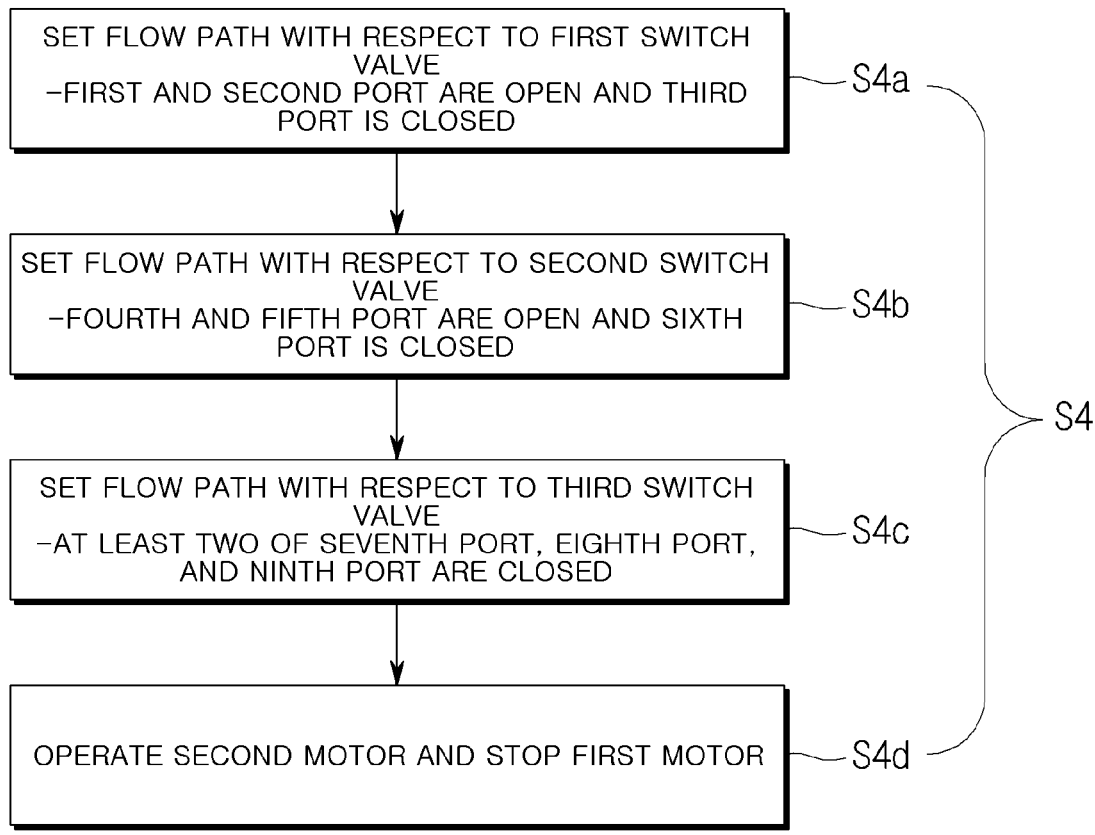

[FIG. 14]
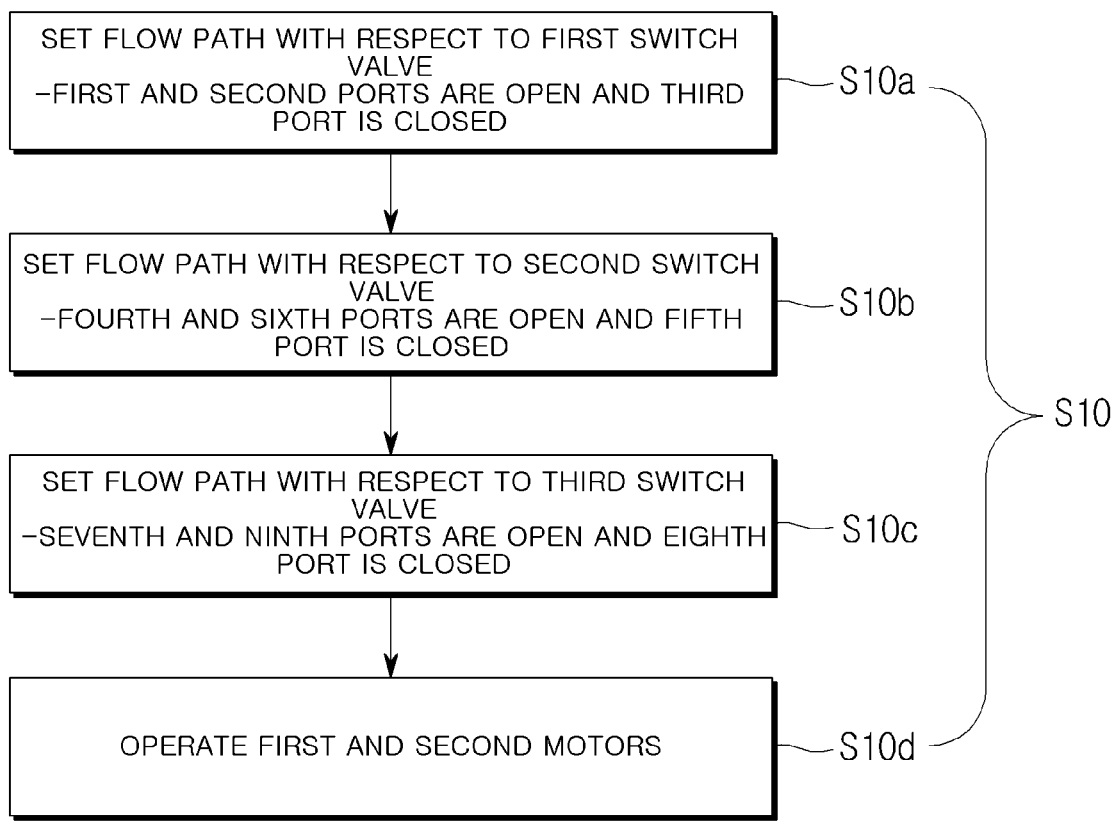

[FIG. 15]
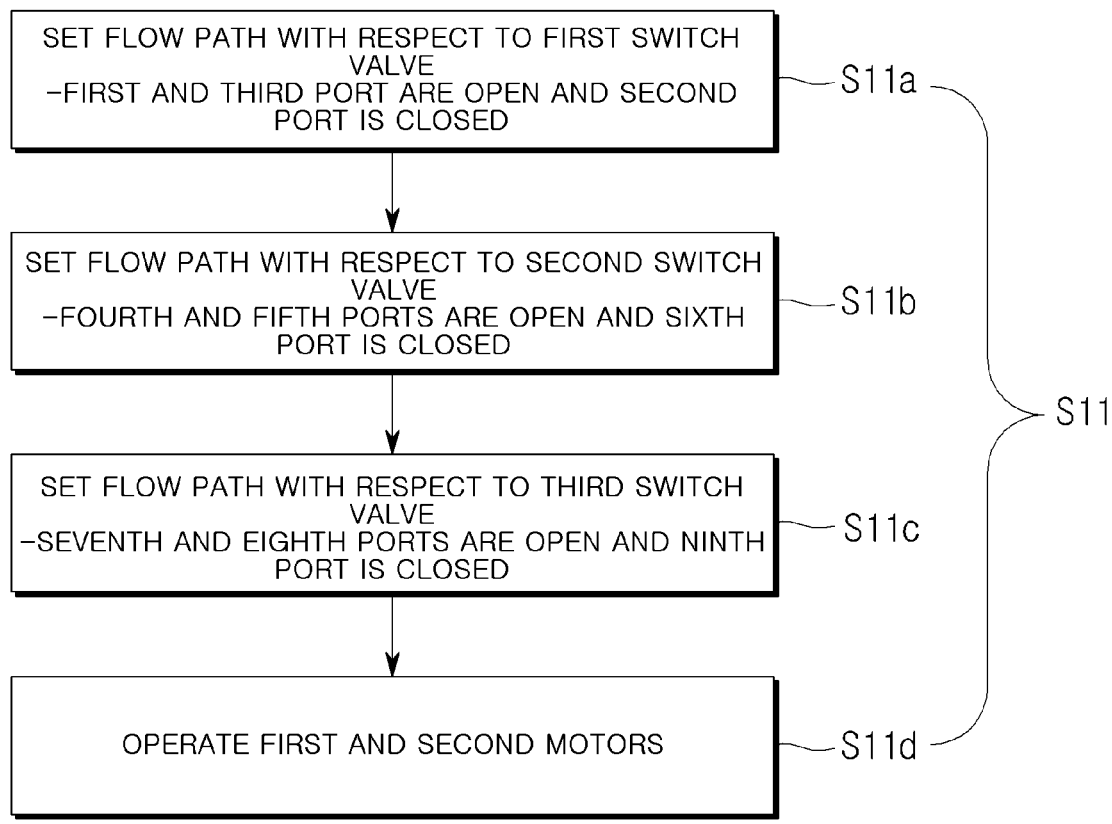

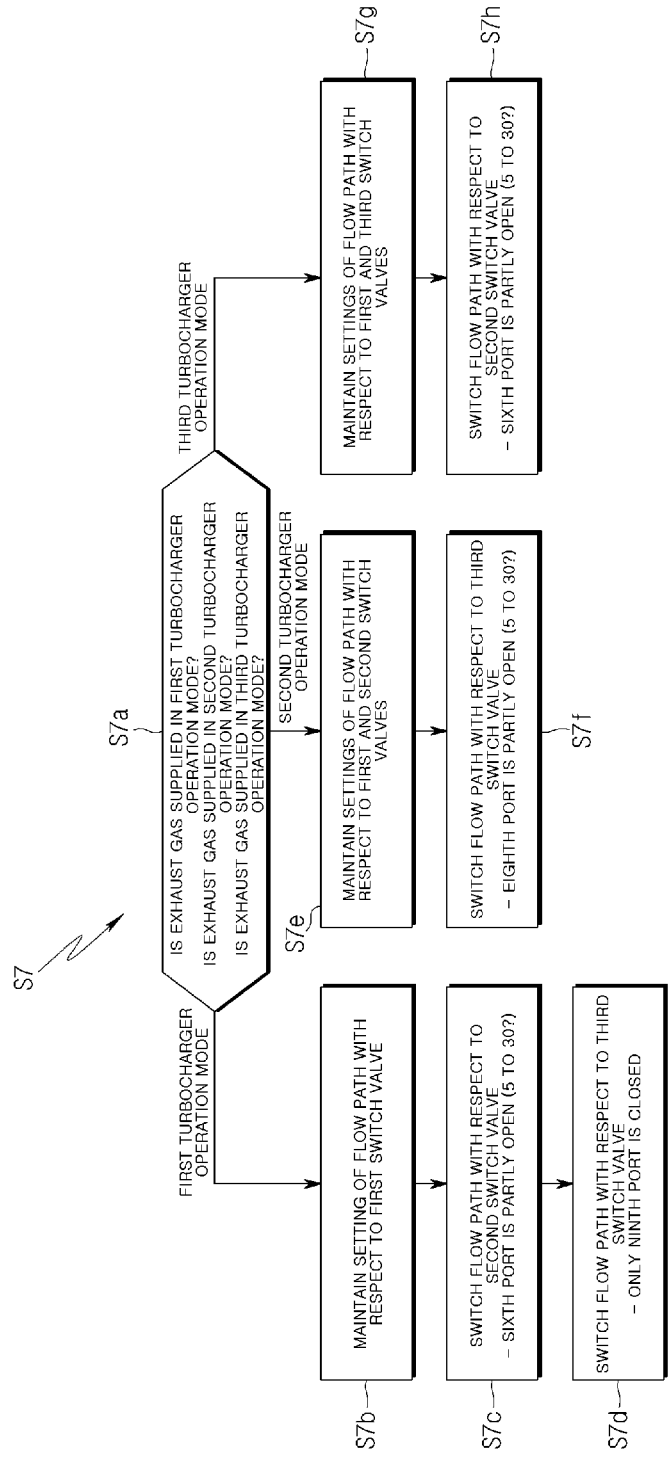
[FIG. 16]

GAS HEAT-PUMP SYSTEM

CROSS REFERENCE TO RELATED APPLICATION

The present application claims priority to Korean Patent Application No. 10-2019-0161649, filed Dec. 6, 2019, the entire contents of which is incorporated herein for all purposes by this reference.

BACKGROUND OF THE INVENTION

Field of the Invention

The present disclosure relates to a gas heat-pump system and, more particularly, to a gas heat-pump system in which switching to a first-stage turbocharge mode or a second-stage turbocharge mode takes place according to a required load ratio of an air conditioning module, and in which a first turbocharger and a second turbocharger, which are drivable independently of each other, operate in the first-stage turbocharge mode or the second-stage turbocharge mode. Thus, the first and second turbochargers can actively operate in a manner that corresponds to a change in load, and the efficiency of the gas heat-pump system can be improved.

Description of the Related Art

A heat-pump system is a system that is capable of performing a cooling or heating operation through a refrigeration cycle, and operates in cooperation with a hot water supply apparatus or a cooling and heating apparatus.

That is, hot water is produced or air conditioning for cooling and heating is performed using a heat source that is obtained as a result of heat exchange occurring between cooling refrigerant in the refrigeration cycle and a predetermined heat storage medium.

Generally, a configuration for the refrigeration cycle requires that a compressor compressing refrigerant, a condenser condensing the refrigerant compressed by the compressor, an expansion device decompressing the refrigerant condensed by the condenser, and an evaporator evaporating the decompressed refrigerant are included.

The heat-pump systems are categorized into electric heat-pump systems and gas heat-pump systems according to a type of drive source for driving the compressor.

The electric heat-pump systems, which have a lower load capacity, are suitable for family use.

The gas heat-pump systems, which have a high load capacity, are suitable for industrial use or for large buildings.

Therefore, instead of an electric motor, the gas heat-pump system uses a gas engine in order to drive a high capacity compressor suitable for this high load capacity.

The gas heat-pump system is configured to include an engine that burns a mixture of gaseous and air and (hereinafter referred to as a "a fuel-to-air mixture) and thus generates a motive force, a fuel supply device, a mixer for mixing air and gaseous fuel, and a device for supplying the fuel-to-air mixture to the engine.

Regarding the device for supplying the fuel-to-air mixture, a turbocharger that applies pressure to the fuel-to-air mixture to increase the efficiency and output of the engine and supplies the mixture of air and gaseous to the engine is generally used.

Patent Document 1 discloses a turbocharger that rotates an impeller using a turbine, as a drive source, which is rotated with exhaust gas.

Furthermore, Patent Document 1 discloses a configuration of a two-level pressure application-type turbocharger that applies first-level and second-level pressure to the fuel-to-air mixture to secure a high output of the engine.

However, in the configuration disclosed in Patent Document 1, because the driving of the turbocharger depends only on the exhaust gas from the engine, operation cannot be actively performed according to a change in load on an air conditioning module.

In addition, in the configuration disclosed in Patent Document 1, because the exhaust gas is supplied in a divided manner to a first turbine and a second turbine in a second-stage turbocharge mode, the efficiency of the turbocharger is inevitably lowered in a low rpm section for the engine.

The foregoing is intended merely to aid in the understanding of the background of the present disclosure, and is not intended to mean that the present disclosure falls within the purview of the related art that is already known to those skilled in the art.

DOCUMENT OF RELATED ART

Patent Document (Patent Document 1) Korean Patent No. 10-2005093

SUMMARY OF THE INVENTION

An objective of the present disclosure is to provide a gas heat-pump system in which switching to a first-stage turbocharge mode or a second-stage turbocharge mode takes place according to a required load ratio of an air conditioning module, and in which a first turbocharger and a second turbocharger, which are drivable independently of each other, operate in the first-stage turbocharge mode or the second-stage turbocharge mode. Thus, the first and second turbochargers can actively operate in a manner that corresponds to a change in load, and the efficiency of the gas heat-pump system can be improved.

Another objective of the present disclosure is to provide a gas heat-pump system in which exhaust gas is guided to a fuel-to-air mixture by a turbocharger and in which a portion of the exhaust gas is recirculated to an engine. In the gas heat-pump system, an amount of discharged exhaust gas is decreased, the exhaust gas is forced to be discharged by the turbocharger, and thus an output of the engine is increased.

According to an aspect of the present disclosure, there is provided a gas heat-pump system including: a compressor of an air conditioning module; a gas engine generating a drive force of the compressor; and a turbocharger applying first-level pressure to a fuel-to-air mixture and supplying the resulting fuel-to-air mixture to the gas engine or applying second-level pressure to the fuel-to-air mixture to which the first-level pressure is applied and supplying the resulting fuel-to-air mixture to the gas engine.

In the gas heat-pump system, the turbocharger may include: a first turbocharger including: a first motor; and a first impeller driven by the first motor; and a second turbocharger including: a second motor; and a second impeller driven by the second motor, wherein, when applying the first-level pressure for supply, the first-level pressure may be applied to the fuel-to-air mixture by the second impeller, and when applying the second-level pressure for supply, the first-level pressure may be applied to the fuel-to-air mixture by the first impeller, and the second-level pressure may be applied to the fuel-to-air mixture by the second impeller.

The gas heat-pump system may further include: a mixture device guiding the fuel-to-air mixture to the turbocharger; a connection pipe connecting a discharge port of the first turbocharger and an inlet port of the second turbocharger to each other for a fluid flow, the mixture device being connected to the connection pipe at a position between the discharge port of the first turbocharger and the inlet port of the second turbocharger; a first turbocharger entrance pipe connected to the mixture device upstream from a position where the connection pipe is connected to the mixture device and guiding the fuel-to-air mixture to a first inlet port of the first turbocharger; and a first switch valve arranged at a position where the first turbocharger entrance pipe is connected to the mixture device and switching a flowing direction of the fuel-to-air mixture flowing within the mixture device.

In the gas heat-pump system, the first switch valve may include: a first port connected to the mixture device; a second port connected to the mixture device in a manner that faces the first port; and a third port connected to the first turbocharger entrance port.

The gas heat-pump system may further include; an exhaust pipe guiding exhaust gas discharged from the gas engine to the outside; a first bypass pipe connecting the exhaust pipe and a second inlet port of the first turbocharger to each other for the fluid flow and at least partly guiding the exhaust gas to the first turbocharger; a second switch valve arranged at a position where the first bypass pipe is connected to the exhaust pipe and allowing or blocking the fluid flow between the first bypass pipe and the exhaust pipe; a second bypass pipe of which a first end portion is connected to the exhaust pipe downstream from the position where the first bypass pipe is connected to the exhaust pipe and of which a second end portion is connected to the connection pipe somewhere between a position where the mixture device is connected to the connection pipe and the discharge port of the first turbocharger; and a third switch valve arranged at a position where the second bypass pipe and the connection pipe are connected to each other and allowing or blocking the fluid flow between the second bypass pipe and the connection pipe, wherein the second switch valve may include: a fourth port connected to the exhaust pipe; a fifth port connected to the exhaust pipe in a manner that faces the fourth port; and a sixth port connected to the first bypass pipe, and the third switch valve may include: a seventh port connected to the connection pipe; an eighth port connected to the connection pipe in a manner that faces the seventh port; and a ninth port connected to the second bypass pipe.

The gas heat-pump system may further include: a controller adjusting an output rpm of the gas engine in a manner that corresponds to a required load ratio of the air conditioning module, wherein when it is determined that the required load ratio is lower than a first reference load ratio, the controller may perform control in such a manner that the turbocharger operates in a first turbocharger operation mode, when it is determined that the required load ratio is equal to or higher than the first reference load ratio and is lower than a second reference load ratio, the controller may perform control in such a manner that the turbocharger operates in a second turbocharger operation mode, when it is determined that the required load ratio is equal to or higher than the second reference load ratio, the controller may perform control in such a manner that the turbocharger operates in a third turbocharger operation mode, and the second reference load ratio may be higher than the first reference load ratio.

In the gas heat-pump system, the first reference load ratio may be 30% of a maximum amount of load on the air conditioning module, and the second reference load ratio may be 70% of the maximum amount of load.

In the gas heat-pump system, in the first turbocharge operation mode, the controller may set a flow path with respect to the first switch valve in such a manner that the first port and the second port are open and that the third port is closed, may set the flow path with respect to the second switch valve in such a manner that the fourth port and the fifth port are open and that the sixth port is closed, and may set the flow path with respect to the third switch valve in such a manner that at least two of the seventh port, the eighth port, and the ninth port are closed.

In the gas heat-pump system, in the first turbocharger operation mode, the controller may supply electric power to the second motor and thus may rotate the second impeller, and may block the electric power from being supplied to the first motor and thus may stop the first impeller.

In the gas heat-pump system, while operation in the first turbocharger operation mode is in progress, the controller may determine whether or not the output rpm of the gas engine reaches a target rpm corresponding to the required load ratio, and when it is determined that the output rpm of the gas engine reaches the target rpm, the controller may perform control in such a manner that the exhaust gas is at least partly introduced into the gas engine.

In the gas heat-pump system, in order to at least partly introduce the exhaust gas into the gas engine, the controller may maintain the flow path with respect to the first switch valve, may switch the flow path with respect to the second switch valve in such a manner that the fourth port and the fifth port are open and that the sixth port is partly open, and may switch the flow path with respect to the third switch valve in such a manner that the seventh port and the eighth port are open and that the ninth port is closed.

In the gas heat-pump system, the degree of opening to which the sixth port is partly open may range from 5 to 30%.

In the gas heat-pump system, in the second turbocharger operation mode, the controller may set the flow path with respect to the first switch valve in such a manner that the first port and the second port are open and that the third port is closed, may set the flow path with respect to the second switch valve in such a manner that the fourth port and the sixth port are open and that the fifth port is closed, and may set the flow path with respect to the third switch valve in such a manner that the seventh port and the ninth port are open and that the eighth port is closed.

In the gas heat-pump system, in the second turbocharger operation mode, the controller may supply electric power to the first motor and the second motor and thus may rotate the first impeller and the second impeller.

In the gas heat-pump system, while operation in the second turbocharger operation mode is in progress, the controller may determine whether or not the output rpm of the gas engine reaches a target rpm corresponding to the required load ratio, and when it is determined that the output rpm of the gas engine reaches the target rpm, the controller may perform control in such a manner that the exhaust gas is at least partly introduced into the gas engine.

In the gas heat-pump system, in order to at least partly introduce the exhaust gas into the gas engine, the controller may maintain the settings of the flow paths with respect to first switch valve and the second switch valve, and may switch the flow path with respect to the third switch valve in such a manner that the seventh port and the ninth port are open and that the eighth port is partly open.

In the gas heat-pump system, the degree of opening to which the eighth port is partly open may range from 5 to 30%.

In the gas heat-pump system, in the third turbocharger operation mode, the controller may set a flow path with respect to the first switch valve in such a manner that the first port and the third port are open and that the second port is closed, may set the flow path with respect to the second switch valve in such a manner that the fourth port and the fifth port are open and that the sixth port is closed, and may set the flow path with respect to the third switch valve in such a manner that the seventh port and the eighth port are open and that the ninth port is closed.

In the gas heat-pump system, in the third turbocharger operation mode, the controller may supply electric power to the first motor and the second motor and thus may rotate the first impeller and the second impeller.

In the gas heat-pump system, while operation in the third turbocharger operation mode is in progress, the controller may determine whether or not the output rpm of the gas engine reaches a target rpm corresponding to the required load ratio, and when it is determined that the output rpm of the gas engine reaches the target rpm, the controller may perform control in such a manner that the exhaust gas is at least partly introduced into the gas engine.

In the gas heat-pump system, in order to at least partly introduce the exhaust gas into the gas engine, the controller may maintain the settings of the flow paths with respect to the first switch valve and the third switch valve, and may switch the flow path with respect to second switch valve in such a manner that the fourth port and the fifth port are open and the sixth port is partly open.

In the gas heat-pump system, the degree of opening to which the sixth port is partly open may range from 5 to 30%.

In the gas heat-pump system according to the present disclosure, switching to a first-stage turbocharge mode or a second-stage turbocharge mode takes place according to the required load ratio of the air conditioning module, and the first turbocharger and the second turbocharger, which are drivable independently of each other, operate in the first-stage turbocharge mode or the second-stage turbocharge mode. Thus, the first and second turbochargers can actively operate in a manner that corresponds to a change in load, and the efficiency of the gas heat-pump system can be improved.

In addition, in the gas heat-pump system, the exhaust gas is guided to the fuel-to-air mixture by the turbocharger and a portion of the exhaust gas is recirculated to the engine. Thus, an amount of discharged exhaust gas can be decreased, the exhaust gas can be forced to be discharged by the turbocharger, and thus an output of the engine can be increased.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is a graph illustrating a process of switching a turbocharger operation mode according to a load ratio of an air conditioning module and a compressor operation stage;

FIG. 4 is a table illustrating compressor operations stages that are entered when using a plurality of the compressors in FIG. 3;

FIGS. 5 to 10 are views each schematically illustrating a state where flow paths for a mixture of air and gaseous and exhaust gas are set for each turbocharger operation mode according to the embodiment of the present disclosure;

FIG. 11 is a block diagram illustrating a configuration of a controller of a gas heat-pump system according to the embodiment of the present disclosure; and FIGS. 12 to 16 are flow charts each illustrating a method of controlling the gas heat-pump system according to the embodiment of the present disclosure.

DETAILED DESCRIPTION OF THE INVENTION

Figure 1:
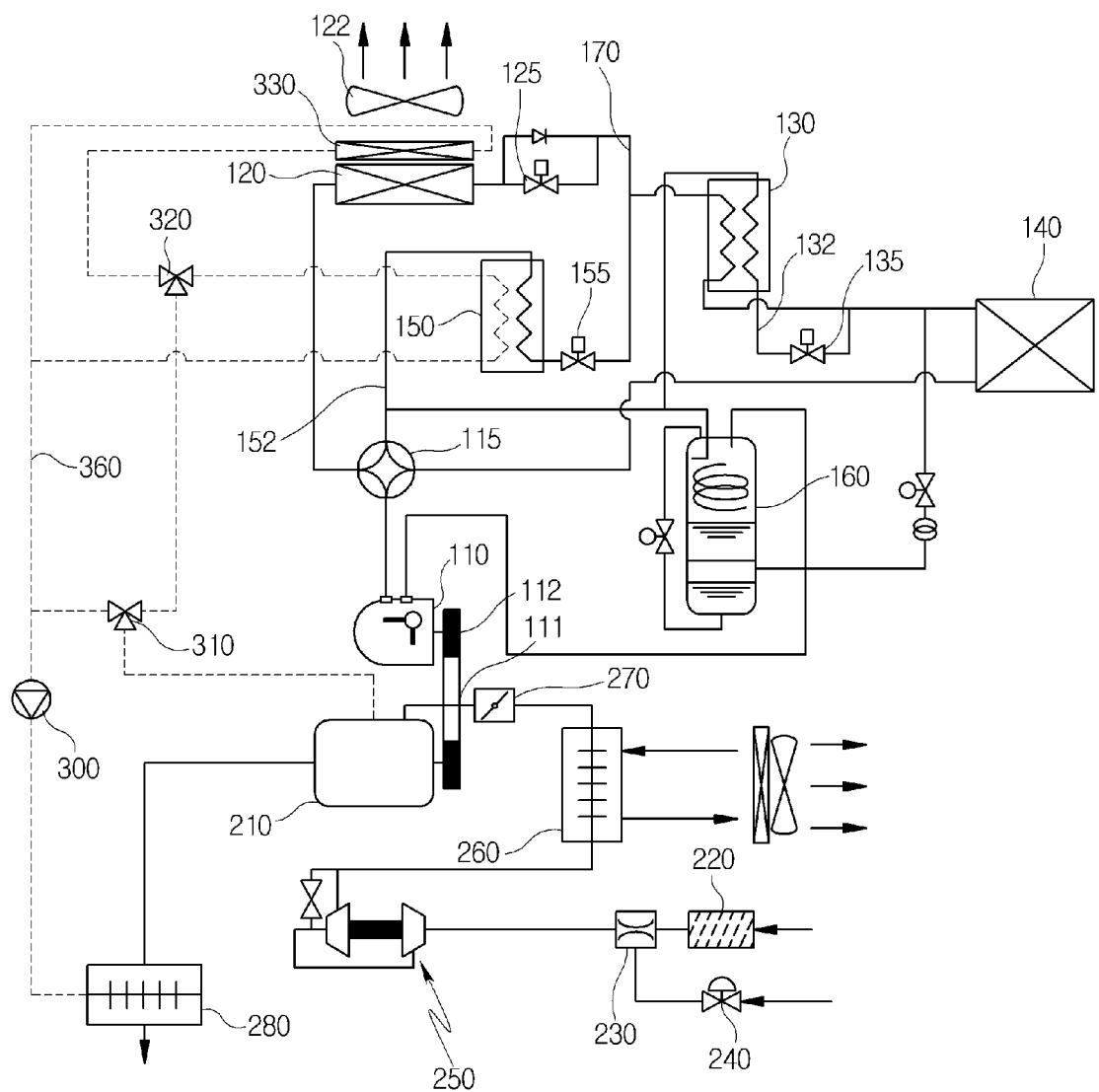
FIG. 1 is a view schematically illustrating a configuration of a gas heat-pump system according to an embodiment of the present disclosure.

Exemplary embodiments of the present disclosure will be described in detail below with reference to the accompanying drawings.

Various modifications can be made to the present disclosure, and thus various embodiments can be implemented. The resulting specific embodiments will also be described in detail below with reference to the drawings. This description is not intended to limit the present disclosure to the specific embodiments. All alterations, equivalents, and substitutes that are included within the technical idea of the present disclosure should be construed as falling within the scope of the present disclosure.

The terms first and second, and so on are used to describe various constituent elements, but should not be construed as imposing any limitation on the various constituent elements. These terms are used only to distinguish one element from another. For example, a first constituent element may be expressed as a second constituent element without departing from the scope of the present disclosure. In the same manner, the second constituent element may also be expressed as the first constituent element.

The phrase "and/or" is used to join two words, phrases, and sentences or to refer to one of the two words, phrases, and sentences.

It should be understood that, when a constituent element is referred to as being "coupled to" or "connected to" a different constituent element, this means that the constituent element may be directly coupled to or directly connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween.

The terms used in the present specification are only for describing specific embodiments and are not intended to impose any limitation on the present disclosure. The indefinite article "a/an" is used to mean "one or more", not only one, except as distinctively expressed in context.

The term "include," "have" or the like in the present application is intended to indicate that a feature, a number, a step, an operation, a constituent element, a component, or combinations of these, which is described in the specification, is present, and thus should be understood not to preclude in advance the possibility that one or more other features, numbers, steps, operations, constituent elements, components, or combinations of these will be present or added.

Unless otherwise defined, each of the terms, including technical and scientific terms, which are used in the present specification, has the same meaning as is normally understood by a person of ordinary skill in the art to which the present disclosure pertains. The term as defined in commonly used dictionaries should be construed as having the same meaning in context in the art and, unless otherwise explicitly defined in the present specification, is not construed as having an ideal meaning or an excessively-formal meaning.

The embodiments will be provided below for illustrative purpose to help a person of ordinary skill in the art to get a full understanding of the present disclosure, and shapes, sizes, and the like of elements in the drawings can be exaggerated for clearer description.

Figure 2:
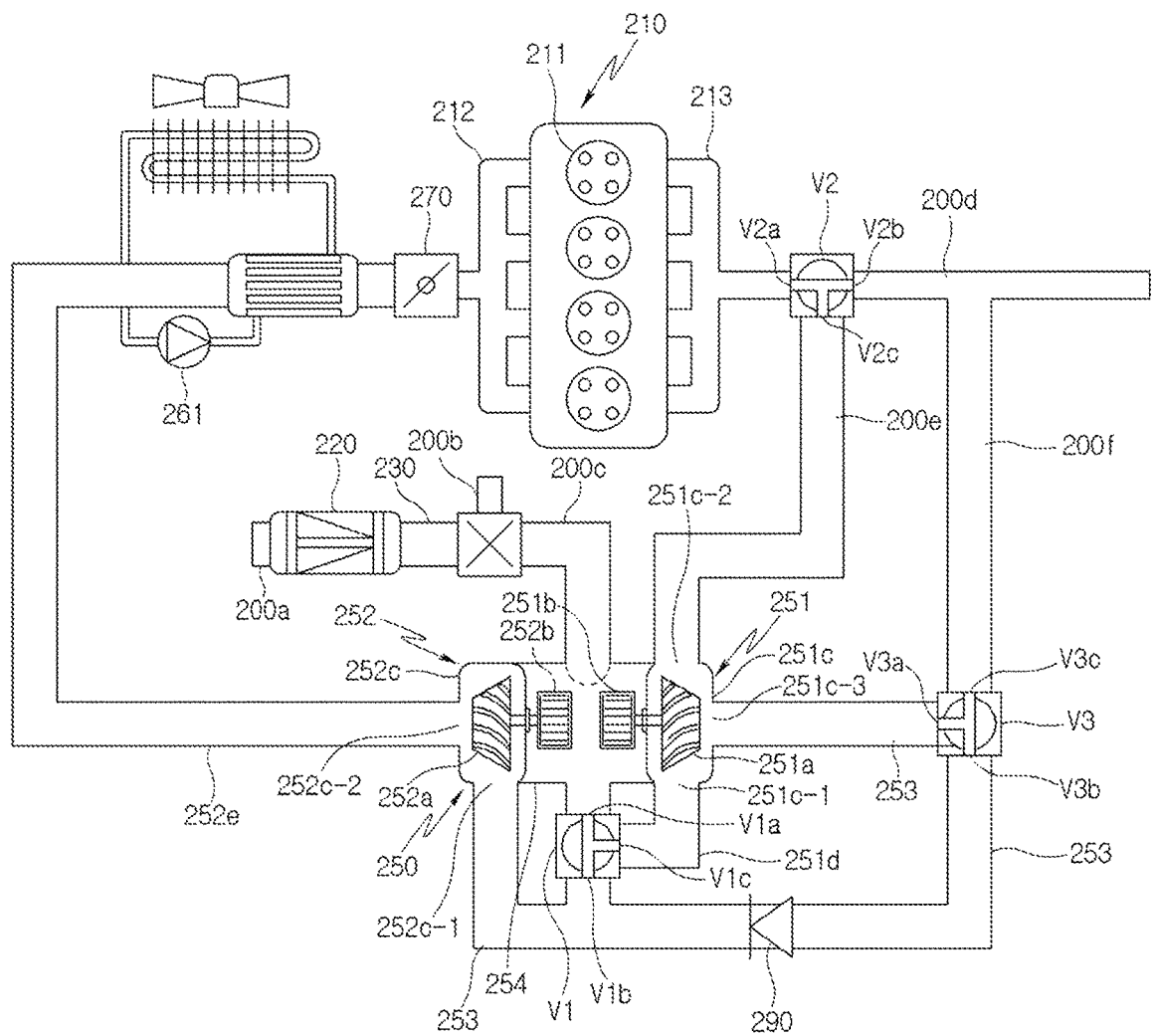
FIG. 2 is a view illustrating a detailed configuration of an engine module in FIG. 1.

FIG. 1 is a view schematically illustrating a configuration of a gas heat-pump system according to an embodiment of the present disclosure. FIG. 2 is a view illustrating a detailed configuration of an engine module in FIG. 1.

With reference to FIG. 1, a gas heat-pump system 10 according to an embodiment of the present disclosure includes an air conditioning module, an engine module, and a cooling module.

The air conditioning module includes a plurality of components that are necessary for a refrigerant cycle.

For example, the air conditioning module includes a compressor 110 and a four-way valve 115. The compressor 110 compresses refrigerant. The four-way valve 115 switches a direction of the refrigerant compressed in the compressor 110.

The compressor 110 operates with a drive force generated by an engine 201 that will be described below, and serves to compress the refrigerant in a gas state and to discharge the resulting refrigerant.

A pulley and clutch assembly 112 is provided on a drive shaft of the compressor 110. The drive force generated by the engine 210 is transferred to the compressor 110 through a belt 111 and the pulley and clutch assembly 112.

In FIG. 1, a configuration in which the air conditioning module includes one compressor 110 is illustrated, but the air conditioning module may include a plurality of compressors 110, depending on a load capacity of an indoor air conditioning condenser unit.

The plurality of compressors 110 each have the pulley and clutch assembly 112 to which the drive force generated by the engine 210 is selectively transferred.

Furthermore, the air conditioning module may further include an outdoor heat exchanger 120 and an indoor heat exchanger 140.

The outdoor heat exchanger 120 is arranged within an outdoor air conditioning condenser unit that is installed outdoors, and the indoor heat exchanger 140 is arranged within the indoor air conditioning condenser unit that is installed indoors.

The refrigerant that passes through the four-way valve 115 flows to the outdoor heat exchanger 120 or the indoor heat exchanger 140.

Components other than the indoor heat exchanger 140 and an indoor expansion device 145 of the gas heat-pump system 10, which are illustrated in FIG. 1, are arranged outdoors, that is, are arranged within the outdoor air conditioning condenser unit.

In a case where the gas heat-pump system 10 operates in a cooling operation mode, the refrigerant passing through the four-way valve 115 flows toward the indoor heat exchanger 140 through the outdoor heat exchanger 120.

In contrast, in a case where the gas heat-pump system 10 operates in a heating operation mode, the refrigerant passing through the four-way valve 115 flows toward the outdoor heat exchanger 120 through the indoor heat exchanger 140.

The air conditioning module may further include a refrigerant pipe 170 (a flow path indicated by a solid line) that connects the compressor 110, the outdoor heat exchanger 120, the indoor heat exchanger 140, and the like to each other and guides a flow of the refrigerant.

First, the configuration of the gas heat-pump system 10 operating in the cooling operation mode will be described below.

The refrigerant flowing to the outdoor heat exchanger 120 exchanges heat with outside air and thus is condensed. An outdoor fan 122 that blows the outside air into the outdoor heat exchanger 120 is arranged on one side thereof.

A main expansion device 125 for decompressing the refrigerant is provided to the exit side of the outdoor heat exchanger 120. For example, the main expansion device 125 may include an electronic expansion valve (EEV). The electronic expansion valve (EVV) is controlled using a pulse-width modulation method. In a case where a pulse increases (by a positive value), the degree of opening to which the main expansion device 125 is open is increased. In a case where the pulse decreases (by a negative value), the degree of opening to which the main expansion device 125 is open is decreased.

When performing a cooling operation, the main expansion device 125 is fully open, and thus an operation of decompressing the refrigerant is not performed.

A supercooling heat exchanger 130 for additionally cooling the refrigerant is provided to the exit side of the main expansion device 125. Then, a supercooling flow path 132 is connected to the supercooling heat exchanger 130. The supercooling flow path 132 branches off from the refrigerant pipe 170 and is connected to the supercooling heat exchanger 130.

Then, a supercooling expansion device 135 is installed on the supercooling flow path 132. The refrigerant flowing along the supercooling flow path 132 is decompressed while passing through the supercooling expansion device 135.

In the supercooling heat exchanger 130, heat exchange occurs between the refrigerant in the refrigerant pipe 170 and the refrigerant on the supercooling flow path 132. In a heat exchange process, the refrigerant in the refrigerant pipe 170 is supercooled, and the refrigerant on the supercooling flow path 132 absorbs heat.

The supercooling flow path 132 is connected to a gas-liquid separator 160. The refrigerant on the supercooling flow path 132, which exchanges heat in the supercooling heat exchanger 130, flows into the gas-liquid separator 160.

The refrigerant in the refrigerant pipe 170, which passes through the supercooling heat exchanger 130, flows toward the indoor air conditioning condenser unit, is decompressed in the indoor expansion device 145, and then evaporates in the indoor heat exchanger 140. The indoor expansion device 145 is installed within the indoor air conditioning condenser unit and is configured as the electronic expansion valve (EEV).

In addition, the refrigerant evaporating in the indoor heat exchanger 140 may pass through the four-way valve 115 and then may flow right into the gas-liquid separator 160. Gaseous-phase refrigerant, resulting from refrigerant separation, is absorbed into the compressor 110.

Next, the configuration of the gas heat-pump system 10 operating in the heating operation mode will be described below.

In a heating process, the refrigerant compressed in the compressor 110 flows to the indoor heat exchanger 140, and the refrigerant condensed in the indoor heat exchanger 140 flows to an auxiliary heat exchanger 150. A refrigerant branch pipe 151 is connected to the auxiliary heat exchanger 150.

An expansion valve 152 is provided on a portion, positioned to the entrance side of the auxiliary heat exchanger 150, of the refrigerant branch pipe 151. The expansion valve 152 decompresses the refrigerant while adjusting the flow of the refrigerant.

The auxiliary heat exchanger 150 is a heat exchanger in which heat exchange occurs between low pressure refrigerant and high temperature cooling water. Examples of the auxiliary heat exchanger 150 include a plate-type heat exchanger.

The refrigerant passing through the auxiliary heat exchanger 150 may flow into the gas-liquid separator 160.

In the gas-liquid separator 160, the refrigerant passing through the auxiliary heat exchanger 150 is separated into gas and liquid. The gaseous-phase refrigerant, resulting from the refrigerant separation, is absorbed into the compressor 110.

The cooling module includes a cooling water pipe 360 (a flow path indicated by a dotted line) that guides a flow of cooling water for cooling the engine 210 that will be described below.

A cooling water pump 300, a plurality of flow switch units 310 and 320, and a radiator 330 are installed on the cooling water pipe 360. The cooling water pump 300 generates a flow force of the cooling water. The plurality of flow switch units 310 and 320 switch a flow direction of the cooling water. The radiator 300 cools the cooling water.

The plurality of flow switch units 310 and 320 include a first flow switch unit 310 and a second flow switch unit 320. As an example, the first flow switch unit 310 and the second flow switch unit 320 each have a three-way valve.

The radiator 330 is positioned to one side of the outdoor heat exchanger 120. The cooling water in the radiator 330 exchanges heat with the outside air by driving the outdoor fan 122 and, during this heat exchange process, is cooled.

When the cooling water pump 300 is driven, the cooling water passes through the engine 210 and an exhaust gas heat exchanger 280 and selectively flows into the radiator 330 or the auxiliary heat exchanger 150 through the first flow switch unit 310 and the second flow switch unit 320.

The engine module includes the engine 210 and various components for supplying a fuel-to-air mixture to the engine 210.

The engine module includes a mixer 230 that is arranged to the entrance side of the engine 210 and mixes air and gaseous fuel.

An air filter 220 and a zero governor 240 are installed upstream from the mixer 230. The air filter 220 supplies purified air to the mixer 230 through an air pipe 220*a*. The zero governor 240 supplies gaseous fuel at predetermined pressure or lower through a fuel pipe 200*b*.

The zero governor 240 is a device that uniformly adjusts output pressure regardless of a magnitude of entrance pressure of the gaseous fuel or a change in an amount of flow and supplies the resulting gaseous fuel.

In the mixer 230, the air passing through the air filter 220 and the gaseous fuel discharged from the zero governor 240 are mixed to generate the fuel-to-air mixture. The generated fuel-to-air mixture is supplied to the engine 210 through a mixture device 200*c*.

The engine module may further include a turbocharger 250 and an adjustment unit 270 that are arranged between the mixer 230 and the engine 210.

The turbocharger 250 applies pressure to the fuel-to-air mixture to increase the density of the fuel-to-air mixture and supplies the resulting fuel-to-air mixture to the engine 210. The turbocharger 250 is used to provide a higher output than in a natural aspirated engine.

As illustrated in FIG. 1, the turbocharger 250 applies pressure to the fuel-to-air mixture that is discharged after being generated as a result of the mixer 230 mixing air and gaseous fuel, and discharges the resulting fuel-to-air mixture toward the engine 210 through a turbocharger exit pipe 252*e* in FIG. 2.

For example, as illustrated in FIG. 2, the turbocharger 250 includes a first turbocharger 251 and a second turbocharger 252. The first turbocharger 251 and the second turbocharger 252 apply first-level pressure to the fuel-to-air mixture generated by the mixer 230, and directly supply the resulting fuel-to-air mixture to the engine 210, or apply second-level pressure to the fuel-to-air mixture to which the first-level pressure is applied and supply the resulting fuel-to-air mixture to the engine 210.

The first turbocharger 251 and the second turbocharger 252 have motors 251*b* and 252*b* and impellers 251*a* and 252*a*, respectively. The motors 251*b* and 252*b* have the same shape and structure. The impellers 251*a* and 252*a* have the same shape and structure. The turbocharger 250 is configured to include the motors 251*b* and 252*b* having the same shape and structure and the impellers 251*a* and 252*a* having the same shape and structure. Thus, the turbocharger 250 has the advantages of possibly achieving miniaturization and efficiency over a turbocharger configured to include one motor and one impeller.

A detailed configuration in which the turbocharger 250 includes the first turbocharger 251 and the second turbocharger 252 will be described below with reference to FIG. 2.

The adjustment unit 270 is arranged between the turbocharger 250 and the engine 210 and adjusts an amount of the compressed fuel-to-air mixture that is to be supplied to the engine 210.

Examples of the adjustment unit 270 include a valve that employs an electronic throttle control (ETC) scheme. An embodiment in which the ETC valve capable of being electronically controlled is used as the adjustment unit 270 will be described below. However, the present disclosure is not limited to this embodiment.

In this manner, the mixer 230 mixes gaseous fuel and air to generate the fuel-to-air mixture. The turbocharger 250 applies high pressure to the generated fuel-to-air mixture, and then the resulting fuel-to-air mixture is supplied to the engine 210.

At this point, an amount of the high pressure fuel-to-air mixture that is to be supplied to the engine 210 is precisely controlled with the ETC valve 270, and thus an output of the engine 210 is controlled.

As described above, the fuel-to-air mixture passing through the turbocharger 250 is in high temperature and high pressure states. For this reason, an intercooler 260 is provided between the turbocharger 250 and the adjustment unit 270. The intercooler 260 lowers the temperature and pressure of the fuel-to-air mixture and supplies the resulting fuel-to-air mixture to a cylinder 211 of the engine 210.

For example, the intercooler 260 is configured in such a manner that heat exchange occurs partly between the fuel-to-air mixture to be supplied to the engine 210 and a portion of the cooling water to flow to the engine 210 or in such a manner that, as illustrated in FIG. 2, heat exchange occurs between the cooling water circulating through a separate water pump 261 in FIG. 2 and the fuel-to-air mixture.

The engine module may further include the exhaust gas heat exchanger 280 which is arranged to the exhaust outlet side of the engine 210 and in which heat exchange occurs between the cooling water and exhaust gas.

FIG. 2 is a view schematically illustrating a configuration of an engine module 200 in FIG. 1. A detailed configuration of the engine module 200 according to an embodiment of the present disclosure will be described below with reference to FIG. 2.

The turbocharger 250 of the engine module 200 according to the embodiment of the present disclosure operates in a plurality of operation modes that vary according to a load ratio of the air conditioning module.

More specifically, the turbocharger 250 operates in a first turbocharger operation mode for a low load ratio section, a second turbocharger operation mode for a medium load ratio section, and a third turbocharger operation mode for a high load ratio section.

In the first turbocharger operation mode and the second turbocharger operation mode, the first-level pressure is applied to the fuel-to-air mixture, and the resulting fuel-to-air mixture is supplied to the engine 210. In the third turbocharger operation mode, the second-level pressure is applied to the fuel-to-air mixture to which the first-level pressure is applied, and the resulting fuel-to-air mixture is supplied to the engine 210.

To this end, the engine module 200 includes the turbocharger 250, a pipe, and a plurality of switch valves. The turbocharger 250 includes the first turbocharger 251 and the second turbocharger 252 that operate independently of each other. The pipe connects the first turbocharger 251 and the second turbocharger 252 to each other for a fluid flow. The plurality of switch valves switch a flowing path for the fuel-to-air mixture that flows along the pipe.

For independent operation, the first turbocharger 251 includes the first motor 251*b*, the first impeller 251*a* that is driven by the first motor 251*b*, and a first housing 251*c* that accommodates the first impeller 251*a*, and the second turbocharger 252 includes the second motor 252*b*, the second impeller 252*a* that is driven by the second motor 252*b*, and a second housing 252*c* that accommodates the second impeller 252*a*.

The first motor 251*b* and the second motor 252*b* are accommodated in a separate motor housing 254.

When applying the first-level pressure for supply, the fuel-to-air mixture is guided to the second turbocharger 252 along the mixture device 200*c*, and the first-level pressure is applied to the fuel-to-air mixture only by the second impeller 252*a* of the second turbocharger 252. Thereafter, the resulting fuel-to-air mixture is supplied to the cylinder 211 of the engine 210 through an intake manifold 212 along the turbocharger exit pipe 252*e* connected to an exhaust outlet 252*c*-2. At this point, the pressure fuel-to-air mixture is not supplied toward the first turbocharger 251.

When applying the second-level pressure for supply, the fuel-to-air mixture is guided to a first turbocharger entrance pipe 251*d* of the first turbocharger 251 along the mixture device 200*c*, the first-level pressure is primarily applied to the fuel-to-air mixture by the first impeller 251*a*, and then the resulting fuel-to-air mixture is discharged through a discharge port 251*c*-3.

The discharged fuel-to-air mixture is guided to an inlet port 252*c*-1 of the second turbocharger 252, the second-level pressure is secondarily applied to the fuel-to-air mixture by the second impeller 252*a*, and then the resulting fuel-to-air mixture is supplied to the cylinder 211 of the engine 210 along the turbocharger exit pipe 252*e*.

A pipe is configured to include the mixture device 200*c*, a connection pipe 253, the first turbocharger entrance pipe 251*d*, a first bypass pipe 200*e*, and a second bypass pipe 200*f*.

The mixture device 200*c* serves to guide the fuel-to-air mixture, generated by the mixer 230 mixing air and gaseous fuel, to the turbocharger 250.

As illustrated, the mixer 230 is connected upstream from the mixture device 200*c*, and the air pipe 200*a* and the fuel pipe 200*b* are connected to the mixer 230.

The first turbocharger entrance pipe 251*d* and the connection pipe 253 are connected downstream from the mixture device 200*c*.

The connection pipe 253 serves to connect the discharge port 251*c*-3 of the first turbocharger 251 and the inlet port 252*c*-1 of the second turbocharger 252 for the fluid flow. The fuel-to-air mixture to which the first-level pressure is primarily applied in the first turbocharger 251 is guided to the second turbocharger 252 along the connection pipe 253.

The mixture device 200*c* is connected to the connection pipe 253 at a position between the discharge port 251*c*-3 of the first turbocharger 251 and the inlet port 252*c*-1 of the second turbocharger 252.

The first turbocharger entrance pipe 251*d* serves to guide the fuel-to-air mixture to a first inlet portion 251*c*-1 of the first turbocharger 251 and is configured in such a manner that the connection pipe 253 is connected to the mixture pipe 200*c* upstream from a position where the connection pipe 253 is connected to the mixture device 200*c*.

At this point, a first switch valve V1 is arranged at a position where the first turbocharger entrance pipe 251*d* is connected to the mixture device 200*c*.

The first switch valve V1 performs a function of switching a flow direction of the fuel-to-air mixture flowing in the mixture device 200*c* to a direction of the connection pipe 253 or a direction of the first turbocharger entrance pipe 251*d*. It is desirable that the first switch valve V1 is configured as a three-way valve including a first port V1*a*, a second port V1*b*, and a third port V1*c*. The first port V1*a* is connected to the mixture device 200*c*. The second port V1*b* is connected to the mixture device 200*c* in a manner that faces the first port V1*a*. The third port V1*c* is connected to the first turbocharger entrance pipe 251*d*.

The first port V1*a*, the second port V1*b*, and the third port V1*c* are controlled in such a manner that a flow path is open or closed independently of each other.

The first bypass pipe 200*e* connects an exhaust pipe 200*d* and a second inlet port 251*c*-2 of the first turbocharger 251 to each other for the fluid flow and serves to at least partly guide the exhaust gas to the first turbocharger 251.

As will be described below, the first bypass pipe 200*e* has the purpose of recirculating a portion of the exhaust gas according to the above-described operation modes of the turbocharger 250 to the engine 210 and the purpose of wholly or partly forcing the exhaust gas to be discharged through the first turbocharger 251.

The second switch valve V2 is provided to selectively introduce the exhaust gas into the first turbocharger 251 along the first bypass pipe 200*e* according to the operation modes of the turbocharger 250.

As illustrated, the second switch valve V2 is arranged at a position where the first bypass pipe 200*e* is connected to the exhaust pipe 200*d*.

The second switch valve V2 is configured as a three-way valve in the same way as the first switch valve V1. The second switch valve V2 includes a fourth port V2a, a fifth port V2b, and a sixth port V2c. The fourth port V2a is connected to the exhaust pipe 200d. The fifth port V2b is connected to the exhaust pipe 200d in a manner that faces the fourth port V2a. The sixth port V2c is connected to the first bypass pipe 200e.

Likewise, the fourth port V2a, the fifth port V2b, and the sixth port V2c are controlled in such a manner that the flow path is open or closed independently of each other.

The second bypass pipe 200f is configured to connect the exhaust pipe 200d and the above-described connection pipe 253 to each other for the fluid flow.

More specifically, a first end portion of the second bypass pipe 200f is connected to the exhaust pipe 200d downstream from a position where the first bypass pipe 200e is connected to the exhaust pipe 200d. Then, a second end portion of the second bypass pipe 200f is connected to the connection pipe 253 somewhere between a position where the mixture device 200c is connected to the connection pipe 253 and the discharge port 251c-3 of the first turbocharger 251.

In this case, a third switch valve V3 that allows or blocks the fluid flow between the second bypass pipe 200f and the connection pipe 253 according to the operation modes of the turbocharger 250 is provided.

The third switch valve V3 is configured as a three-way valve in the same way as the first switch valve V1 and the second switch valve V2. The third switch valve V3 includes a seventh port V3a, an eighth port V3b, and a ninth port V3c. The seventh port V3a is connected to the connection pipe 253. The eighth port V3b is connected to the connection pipe 253 in a manner that faces the seventh port V3a. The ninth port V3c is connected to the second bypass pipe 200f.

Likewise, the 7-seventh port V3a, the 8-eighth port V3b, and the 9-ninth port V3c are controlled in such a manner that the flow path is open or closed independently of each other.

As illustrated, check valve 290 is included in the connection pipe 253 at a position adjacent to the first switch valve V1

The check valve 290 serves to limit a flow direction of fluid in such a manner that in the first and second turbocharger operation modes, the fuel-to-air mixture passing through the first switch valve V1 does not flow toward the third switch valve V3.

Accordingly, in the first and second turbocharger operation modes, the fuel-to-air mixture is effectively blocked from flowing toward the first turbocharger 251 along the connection pipe 253. Thus, the fuel-to-air mixture can be prevented from being wasted.

FIG. 3 is a graph illustrating a process of switching the turbocharger operation mode according to a load ratio of the air conditioning module and stages in which the compressor 110 operates.

Stages in which a first compressor 110 and a second compressor 110 are to operate are preset in a manner that corresponds to the load ratio of the air conditioning module.

As illustrated in FIG. 4, the first stage refers to a state where the air conditioning module operates only with the first compressor 110. In the first stage, a first clutch of the first compressor 110 operates, the drive force of the engine 210 is transferred to the first compressor 110, and a first capacity valve is controlled to be partly open.

The second stage refers to a state where the air conditioning module operates with the first compressor 110 and the second compressor 110. In the second stage, the first clutch of the first compressor 110 and a second clutch of the second compressor 110 operate, and the drive force of the engine 210 is transferred to both the first compressor 110 and the second compressor 110 at the same time. In this case, the first capacity valve and a second capacity valve are controlled to be partly open, and thus an amount of refrigerant discharged by the compressor 110 is controlled.

The third stage refers to a state where the air conditioning module operates at a higher load ratio than in the first and second stages. In the third stage, the first compressor 110 and the second compressor 110 are controlled to discharge a larger amount of refrigerant. Unlike in the second stage, the first capacity valve is controlled to be fully open.

The fourth stage refers to a state where the air conditioning module operates at the highest load ratio. Unlike in the third stage, control is performed in such a manner that the first capacity valve and the second capacity valve are both controlled to be open and that the amount of refrigerant discharged by the compressor 110 is thus maximized.

An output of the engine 210, that is, an rpm of the engine 210 is controlled to be increased or decreased in a manner that corresponds to the stage in which the compressor 110 operates.

In a case where the output of the engine 210 is increased or decreased, in order to adjust the mount of the fuel-to-air mixture to be supplied to the engine 210, there is also a need to adjust an output of the turbocharger 250.

To this end, the gas heat-pump system 10 according to the embodiment of the present disclosure regulates the turbocharger operation modes for efficiently operating the engine 210 according to an amount of load on the air conditioning module.

More specifically, sections for load ratios are set to be divided into a section for a low load ratio that is lower than 30%, a section for a medium load ratio that is equal to or higher than 30% and is lower than 70%, and a section for a high load ratio that is equal to or higher than 70%.

In this case, with the configuration illustrated in FIG. 2, the turbocharger 250 operates in the first turbocharger operation mode in the section for the low load ratio, operates in the second turbocharger operation mode in the section for the medium load ratio, and operates the third turbocharger operation mode in the section for the high load ratio. Thus, the turbocharger 250 can effectively operate in a manner that corresponds to a change in load on the engine 210. The operational efficiency of the engine 210 and the turbocharger 250 can thus be improved.

First, the first turbocharger operation mode in the section for the low load ratio will be described with reference to FIGS. 5 and 6.

As illustrated in FIG. 5, because the rpm and torque of the engine 210 are maintained to a relatively low level in the section for the low load ratio that is lower than 30%, the engine 210 operates only with a small amount of the fuel-to-air mixture.

Therefore, the turbocharger 250 operates in the first turbocharger operation mode in which the first-level pressure is applied to the fuel-to-air mixture and in which the resulting fuel-to-air mixture is then supplied to the engine 210.

In the first turbocharger operation mode, the flow path is set in such a manner that the fuel-to-air mixture is supplied only to the second turbocharger 252.

More specifically, the first port V1a and the second port V1b of the first switch valve V1 are set to be open, and the third port V1c is set to be closed.

Therefore, the fuel-to-air mixture flowing along the mixture device 200c does not flow toward the first turbocharger 251 and is all guided only to the second turbocharger 252 along a path indicated by a solid line.

At this point, electric power is supplied to the second motor 252b of the second turbocharger 252, the second impeller 252a applies pressure to the fuel-to-air mixture, and the resulting fuel-to-air mixture is discharged to the turbocharger exit pipe 252e. Control is performed in such a manner that electric power is not supplied to the first motor 251b of the first turbocharger 251.

In the first turbocharger operation mode, the fourth port V2a and the fifth port V2b of the second switch valve V2 are set to be open, and the sixth port V2c is set to be closed.

Therefore, the exhaust gas that is discharged from the engine 210 through an exhaust manifold 213 is all naturally discharged to the outside along the exhaust pipe 200d without being introduced into the first bypass pipe 200e.

In addition, in the first turbocharger operation mode, at least two of the 7-seventh port V3a, the 8-eighth port V3b, and the 9-ninth port V3c of the third switch valve V3 are set to be closed. In FIG. 5, for example, a state where the 8-eighth port V3b and the 9-ninth port V3c are closed is illustrated. An embodiment in which the 8-eighth port V3b and the 9-ninth port V3c, as illustrated, are closed in the first turbocharger operation mode will be described in a focused manner. However, the present disclosure is not limited to this embodiment.

The third switch valve V3 is set in this manner, and thus the exhaust gas is prevented from being introduced through the second bypass pipe 200f, or the fuel-to-air mixture is prevented from being discharged through the second bypass pipe 200f.

When it is determined that the engine 210 reaches a target rpm while operation in the first turbocharger operation mode is in progress and thus the engine 210 is stabilized, as illustrated in FIG. 6, an exhaust gas recirculation state where a portion of the exhaust gas is recirculated to the engine 210 is set to be entered.

For the exhaust gas recirculation, the sixth port V2c of the second switch valve V2 switches from a closed state to a partly-open state, and the 8-eighth port V3b of the third switch valve V3 switches from a closed state to a fully open state.

An exhaust gas flow path is formed in a direction indicated by a dotted line within the first bypass pipe 200e through the partly-open sixth port V2c and within the connection pipe 253 through the 7-seventh port V3a and the 8-eighth port V3b of the third switch valve V3.

At this point, the degree of opening to which the sixth port V2c is partly open ranges from 5 to 30%.

When the second switch valve V2 and the third switch valve V3 switch the flow path, electric power is supplied to the first motor 251b of the first turbocharger 251, and the first impeller 251a is controlled to be rotated.

The first impeller 251a applies pressure to recirculation exhaust gas introduced into the first bypass pipe 200e, and the resulting recirculation exhaust gas is discharged to the connection pipe 253. The discharged recirculation exhaust gas passes through the 7-seventh port V3a and the 8-eighth port V3b of the third switch valve V3.

The recirculation exhaust gas passing through the third switch valve V3, along with the fuel-to-air mixture, is guided to the second turbocharger 252, and pressure is applied to the recirculation exhaust gas and the fuel-to-air mixture by the second impeller 252a. Then, the resulting recirculation exhaust gas and the resulting fuel-to-air mixture are guided to the engine 210.

A portion of the exhaust gas is recirculated in this manner in a state where the operation of the engine 210 is stabilized in the first turbocharger operation mode. Thus, the effects of lowering a combustion temperature within the cylinder 211 and thus reducing an amount of discharged exhaust gas are achieved.

Next, the second turbocharger operation mode in the section for the medium load ratio will be described with reference to FIGS. 7 and 8.

As illustrated in FIG. 7, in the section for the medium load ratio that is equal to or higher than 30% and is lower than 70%, in the same manner as in the first turbocharger operation mode, the turbocharger 250 is controlled to apply the first-level pressure to the fuel-to-air mixture, and to supply the resulting fuel-to-air mixture to the engine 210.

However, unlike in the first turbocharger operation mode in which the exhaust gas is discharged in a natural exhaust manner, in the second turbocharger operation mode, the exhaust gas is forced to be discharged using the first turbocharger 251.

That is, the exhaust gas is forced to be discharged through the first turbocharger 251. Thus, the effects of remarkably lowering exhaust gas resistance of the engine 210 and making a slightly greater improvement in the output and efficiency of the engine 210 than in the first turbocharger operation mode can be achieved.

More specifically, as illustrated in FIG. 7, in the same manner as in the first turbocharger operation mode, the first port V1a and the second port V1b of the first switch valve V1 are maintained in an open state, and the third port V1c thereof is maintained in a closed state.

However, in the second turbocharger operation mode, the fourth port V2a and the sixth port V2c of the second switch valve V2 are set to be open, and the fifth port V2b is set to be closed.

Therefore, the exhaust gas discharged from the engine 210 is all guided to the first turbocharger 251 along the first bypass pipe 200e.

In addition, in the second turbocharger operation mode, the 7-seventh port V3a and the 9-ninth port V3c of the third switch valve V3 are set to be open, and the 8-eighth port V3b thereof is set to be closed.

When the settings of the second switch valve V2 and the third switch valve V3 are completed, electric power is supplied to the first motor 251b, and the first impeller 251a is rotated.

Therefore, the first impeller 251a applies pressure to the exhaust gas introduced along the first bypass pipe 200e. Then, the resulting exhaust gas is discharged to the connection pipe 253, is guided to the second bypass pipe 200f through the third switch valve V3, and is finally forced to be discharged through the exhaust pipe 200d.

When it is determined that the engine 210 reaches a target rpm while operation in the second turbocharger operation mode is in progress and that the engine 210 is thus stabilized, as illustrated in FIG. 8, the exhaust gas recirculation state where a portion of the exhaust gas is recirculated to the engine 210 is set to be entered.

For the exhaust gas recirculation, the 8-eighth port V3b of the third switch valve V3 switches from a closed state to a partly-open state.

The exhaust gas flow path is formed in a direction indicated by a dotted line within the connection pipe 253 through the partly-open 8-eighth port V3b.

At this point, the degree of opening to which the sixth port V2c is partly open ranges from 5 to 30%.

The recirculation exhaust gas passing through the third switch valve V3, along with the fuel-to-air mixture, is guided to the second turbocharger 252, and pressure is applied to the recirculation exhaust gas and the fuel-to-air mixture by the second impeller 252a. Then, the resulting recirculation exhaust gas and the resulting fuel-to-air mixture are guided to the engine 210.

A portion of the exhaust gas is recirculated in this manner in the state where the operation of the engine 210 is stabilized in the second turbocharger operation mode. Thus, the effects of lowering the combustion temperature within the cylinder 211 and thus reducing the amount of discharged exhaust gas are achieved.

Next, the third turbocharger operation mode in the section for the high load ratio will be described with reference to FIGS. 9 and 10.

As illustrated in FIG. 9, in the section for the high load ratio that exceeds 70%, the turbocharger 250 switches to the third turbocharger operation mode in which the second-level pressure is applied to the fuel-to-air mixture and in which the resulting fuel-to-air mixture is then supplied to the engine 210.

That is, in order to raise the output of the engine 210 to a maximum, the second-level pressure is applied to the fuel-to-air mixture by the first turbocharger 251 and the second turbocharger 252, and then the resulting fuel-to-air mixture is supplied to the engine 210.

More specifically, as illustrated in FIG. 9, the first port V1a and the third port V1c of the first switch valve V1 are open, and the second port V1b thereof is fully closed through switching.

Therefore, the fuel-to-air mixture guided through the mixture device 200c is all guided to the first turbocharger 251.

In addition, in the third turbocharger operation mode, the fourth port V2a and the fifth port V2b of the second switch valve V2 are set to be open, and the sixth port V2c thereof is set to be closed.

Therefore, the exhaust gas discharged from the engine 210 is all naturally discharged along the exhaust pipe 200d without being introduced into the first bypass pipe 200e.

In addition, in the third turbocharger operation mode, the 7-seventh port V3a and the 8-eighth port V3b of the third switch valve V3 are set to be open, and the 9-ninth port V3c thereof is set to be closed.

Accordingly, the fuel-to-air mixture to which the first-level pressure is primarily applied by the first turbocharger 251 is blocked from flowing to the second bypass pipe 200f, and is all guided to the second turbocharger 252 along the connection pipe 253.

When the settings of the first switch valve V1, the second switch valve V2, and the third switch valve V3 are completed, electric power is supplied to the first motor 251b, and the first impeller 251a is rotated.

Therefore, the first impeller 251a applies the pressure to the fuel-to-air mixture that is introduced through the mixture device 200c, and then the resulting fuel-to-air mixture is discharged to the connection pipe 253 and is guided to the second turbocharger 252 through the third switch valve V3. Finally, the second impeller 252a of the second turbocharger 252 secondarily applies the second-level pressure to the fuel-to-air mixture. Thereafter, the resulting fuel-to-air mixture is discharged and then is guided to the engine 210.

When it is determined that the engine 210 reaches a target rpm while operation in the third turbocharger operation mode is in progress and that the engine 210 is thus stabilized, as illustrated in FIG. 10, the exhaust gas recirculation state where a portion of the exhaust gas is recirculated to the engine 210 is set to be entered.

For the exhaust gas recirculation, the sixth port V2c of the second switch valve V2 switches from a closed state to a partly-open state.

The exhaust gas flow path is formed in a direction indicated by a dotted line within the first bypass pipe 200e through the sixth port V2c.

At this point, the degree of opening to which the sixth port V2c is partly open ranges from 5 to 30%.

The recirculation exhaust gas passing through the second switch valve V2 is guided to the second inlet port 251c-2 of the first turbocharger 251. Then, the first impeller 251a primarily applies the first-level pressure to the recirculation exhaust gas, along with the fuel-to-air mixture, and then the resulting recirculation exhaust gas and the resulting fuel-to-air mixture are discharged to the connection pipe 253.

The fuel-to-air mixture and the recirculation exhaust gas to which the first-level pressure is primarily applied by the first turbocharger 251 and which are then discharged are guided to the second turbocharger 252 through the connection pipe 253. The second impeller 252a secondarily applies the second-level pressure to the fuel-to-air mixture and the recirculation exhaust gas, and then the resulting fuel-to-air mixture and the resulting recirculation exhaust gas are guided to the engine 210.

A portion of the exhaust gas is recirculated in this manner in the state where the operation of the engine 210 is stabilized in the third turbocharger operation mode. Thus, the effects of lowering the combustion temperature within the cylinder 211 and thus reducing the amount of discharged exhaust gas are achieved.

FIG. 11 is a block diagram illustrating a controller 300 of the gas heat-pump system 10 according to the embodiment of the present disclosure. FIGS. 12 to 16 are flow charts each illustrating a method of controlling the gas heat-pump system 10 according to the present disclosure.

A method of controlling the gas heat-pump system 10 according to the present disclosure will be described below with a focus on the controller 300.

As illustrated, the controller 300 is electrically connected to the air conditioning module, a cooling module, the power supply unit 400, and the engine module 200 and generates signals for controlling these components.

First, in a state where the gas heat-pump system 10 is stopped, when a system operation signal is input through an operation unit that is not illustrated, the controller 300 generates signals for operating the air conditioning module, the cooling module, and the engine module 200, receives necessary electric power from the power supply unit 400, and supplies the received necessary electric power to the air conditioning module, the cooling module, and the engine module 200.

A specific method and configuration in which the controller 300 controls the air conditioning module and the cooling module are known in the art, and therefore detailed descriptions thereof are omitted.

An operational condition for operating the engine module 200 is read from a memory 310. Specifically, control is performed in such a manner that the air pipe 200a and the fuel pipe 200b, which are not illustrated, are open, and that air and fuel are thus introduced from the air pipe 200a and the fuel pipe 200b, respectively, and are mixed in the mixer 230.

In addition, in order to drive the turbocharger 250, the controller 300 performs control in such a manner that electric power is supplied to the first motor 251b and the second motor 252b. As described above, the controller 300 performs control in such a manner that the first motor 251b and the second motor 252b operate independently of each other and that the first turbocharger operation mode, the second turbocharger operation mode, and the third turbocharger operation mode are thus enabled.

When the fuel-to-air mixture is supplied to the engine 210 according to each of the turbocharger operation modes, the controller 300 transmits an ignition signal to an ignition plug in accordance with a stroke of each cylinder 211 and ignites the fuel-to-air mixture supplied to each cylinder 211.

Actuators (not illustrated) for driving the first switch valve V1, the second switch valve V2, and the third switch valve V3 are all electrically connected to the controller 300. According to a control signal of the controller 300, the actuators are driven, and the ports of each of the first switch valve V1, the second switch valve V2, and the third switch valve V3 are controlled to be open or closed independently of each other.

In addition, the controller 300 is electrically connected to a sensor module SM and in real time monitors an operational state and the like of the engine 210 through an electric signal received from the sensor module SM.

In addition, the controller 300 is electrically connected to an actuator of the ETC valve 270. When the output of the engine 210 is increased or decreased, the actuator adjusts the degree of opening to which the ETC valve 270 is open, according to a control signal of the controller 300, and thus increases or decreases the output of the engine 210.

A specific process of controlling the engine module 200 according to a required load ratio of the air conditioning module will be described below.

First, the controller 300 receives a load change signal of the air conditioning module (S1).

The load change signal is input through the above-described operation unit or is input through a cooling load automatic detection unit or the like of the air conditioning module.

When receiving the load change signal, the controller 300 computes a required load ratio and a target rpm of the engine 210, which corresponds to the required load ratio (S2).

At this time, in order to compute the target rpm of the engine 210 for the required load ratio, the controller 300 reads pre-mapped data from the memory 310 and performs the computation.

Next, the controller 300 determines whether or not the required load ratio excesses a first reference load ratio (S3).

It is desirable that the first reference load ratio is 30% of a maximum amount of load.

When it is determined that the required load ratio is lower than the first reference load ratio, the controller 300 performs control in such a manner that the turbocharger 250 operates in the first turbocharger operation mode (S4).

More specifically, as illustrated in FIG. 13, in order for the turbocharger 250 to operate in the first turbocharger operation mode, the controller 300 sets a flow path with respect to the first switch valve V1 in such a manner that the first port V1a and the second port V1b are open and that the third port V1c is closed (S4a).

In addition, the controller 300 sets the flow path with respect to the second switch valve V2 in such a manner that the fourth port V2a and the fifth port V2b are open and that the sixth port V2c is closed (S4b).

In addition, the controller 300 sets the flow path with respect to the third switch valve V3 in such a manner that at least two of the 7-seventh port V3a, the 8-eighth port V3b, and the 9-ninth port V3c are closed (S4c).

It is desirable that the 8-eighth port V3b and the 9-ninth port V3c are closed.

Next, the controller 300 supplies electric power to the second motor 252b and thus rotates the second impeller 252a, and blocks electric power from being supplied to the first motor 251b and thus keeps the first motor 251b in a stopped state (S4d).

When the setting to the first turbocharger operation mode is completed in this manner, the controller 300 adjusts the degree of opening to which a throttle valve is open, in a manner that corresponds to the target rpm of the engine 210 (S5).

Next, the controller 300 determines whether or not an output rpm of the engine 210 reaches the above-described target rpm while the operation in the first turbocharger operation mode is progress (S6).

When it is determined that the output rpm of the engine 210 reaches the target rpm, the controller 300 determines that the operation of the engine 210 is stabilized, and performs control in such a manner that the exhaust gas is recirculated at least partly to the cylinder 211 of the engine 210 (S7).

More specifically, as illustrated in FIG. 16, the controller 300 determines which turbocharger operation mode is currently enabled (S7a).

Because the operation in the first turbocharger operation mode is currently in progress, the controller 300 performs control in such a manner that the setting of the flow path with respect to the first switch valve V1 is maintained (S7b).

Next, the controller 300 switches the flow path with respect to the second switch valve V2 in such a manner that the fourth port V2a and the fifth port V2b are all open and that the sixth port V2c is partly open (S7c).

At this point, the degree of opening to which the sixth port V2c is partly open ranges from 5 to 30%.

In addition, the controller 300 switches the flow path with respect to the third switch valve V3 in such a manner that the 7-seventh port V3a and the 8-eighth port V3b are open and that the 9-ninth port V3c is closed (S7d).

Accordingly, the exhaust gas flow path is formed within the first bypass pipe 200e through the partly-open sixth port V2c and within the connection pipe 253 through the 7-seventh port V3a and the 8-eighth port V3b of the third switch valve V3.

When the switching of the flow paths with respect to the second switch valve V2 and the third switch valve V3 is completed in this manner, the controller 300 maintains a current operational condition and causes the engine 210 to operate in a normal state (S8).

When it is determined in Step S3 that the required load ratio is equal to or higher than the first reference load ratio, the controller 300 additionally determines whether or not the required load ratio exceeds a second reference load ratio (S9).

It is desirable that the first reference load ratio is 70% of the maximum amount of load.

When it is determined that the required load ratio is equal to or higher than the first reference load ratio and is lower than the second reference load ratio, the controller 300 performs control in such a manner that the turbocharger 250 operates in the second turbocharger operation mode (S10).

More specifically, as illustrated in FIG. 14, in order for the turbocharger 250 to operate in the second turbocharger operation mode, the controller 300 sets the flow path with respect to the first switch valve V1 in such a manner that the first port V1a and the second port V1b are open and that the third port V1c is closed (S10a).

In addition, the controller 300 sets the flow path with respect to the second switch valve V2 in such a manner that the fourth port V2a and the sixth port V2c are open and that the fifth port V2b is closed (S10b).

In addition, the controller 300 sets the flow path with respect to the third switch valve V3 in such a manner that the 7-seventh port V3a and the 9-ninth port V3c are open and that the 8-eighth port V3b is closed (S10c).

Next, the controller 300 performs control in such a manner the first motor 251b and the second motor 252b operate at the same time and that the first turbocharger 251 and the second turbocharger 252 are thus all in an operating state (S10d).

Accordingly, the first impeller 251a applies pressure to the exhaust gas introduced through the first bypass pipe 200e, and then the resulting exhaust gas is discharged to the connection pipe 253, is guided to the second bypass pipe 200f through the third switch valve V3, and is finally forced to be discharged through the exhaust pipe 200d.

When the setting to the second turbocharger operation mode is completed in this manner, Steps S5 and S6 are performed.

When it is determined that the output rpm of the engine 210 reaches the target rpm while the operation in the second turbocharger operation mode is in progress, the controller 300 determines that the operation of the engine 210 is stabilized, and performs control in such a manner that the exhaust gas is recirculated at least partly to the cylinder 211 of the engine 210 (S7).

More specifically, as illustrated in FIG. 16, the controller 300 determines which turbocharger operation mode is currently enabled (S7a).

Because the operation in the second turbocharger operation mode is currently in progress, the controller 300 performs control in such a manner that the settings of the flow paths with respect to the first switch valve V1 and the second switch valve V2 are maintained (S7e).

The controller 300 switches the flow path the third switch valve V3 in such a manner that the 7-seventh port V3a and the 9-ninth port V3c are open and that the 8-eighth port V3b is partly open (S7d).

At this point, the degree of opening to which the 8-eighth port V3b is partly open ranges from 5 to 30%.

Accordingly, the recirculation exhaust gas passing through the third switch valve V3, along with the fuel-to-air mixture, is guided to the second turbocharger 252, and the second impeller 252a applies the pressure to the recirculation exhaust gas and the fuel-to-air mixture. Then, the resulting recirculation exhaust gas and the resulting fuel-to-air mixture are guided to the engine 210.

When the switching of the flow path with respect to the third switch valve V3 is completed, the controller 300 maintains the current operational condition and causes the engine 210 to operate in the normal state (S8).

When it is determined in Step S9 that the required load ratio is equal to or higher than the second reference load ratio, the controller 300 performs control in such a manner that the turbocharger 250 operates in the third turbocharger operation mode (S11).

More specifically, as illustrated in FIG. 15, in order for the turbocharger 250 to operate in the third turbocharger operation mode, the controller 300 sets the flow path with respect to the first switch valve V1 in such a manner that the first port V1a and the third port V1c are open and that the second port V1b is closed (S11a).

In addition, the controller 300 sets the flow path with respect to the second switch valve V2 in such a manner that the fourth port V2a and the fifth port V2b are open and that the sixth port V2c is closed (S11b).

In addition, the controller 300 sets the flow path with respect to the third switch valve V3 in such a manner that the 7-seventh port V3a and the 8-eighth port V3b are open and the 9-ninth port V3c is closed (S11c).

Next, the controller 300 performs control in such a manner the first motor 251b and the second motor 252b operate at the same time and that the first turbocharger 251 and the second turbocharger 252 are thus all in the operating state (S11d).

Accordingly, the first impeller 251a applies the pressure to the fuel-to-air mixture that is introduced through the mixture device 200c, and then the resulting fuel-to-air mixture is discharged to the connection pipe 253 and is guided to the second turbocharger 252 through the third switch valve V3. Finally, the second impeller 252a of the second turbocharger 252 secondarily applies the second-level pressure to the fuel-to-air mixture. Thereafter, the resulting fuel-to-air mixture is discharged and then is guided to the engine 210.

When the setting to the third turbocharger operation mode is completed in this manner, Steps S5 and S6 are performed.

When it is determined that the output rpm of the engine 210 reaches the target rpm while the operation in the second turbocharger operation mode is in progress, the controller 300 determines that the operation of the engine 210 is stabilized, and performs control in such a manner that the exhaust gas is recirculated at least partly to the cylinder 211 of the engine 210 (S7).

More specifically, as illustrated in FIG. 16, the controller 300 determines which turbocharger operation mode is currently enabled (S7a).

Because the operation in the third turbocharger operation mode is currently in progress, the controller 300 performs control in such a manner that the settings of the flow paths with respect to first switch valve V1 and the third switch valve V3 are maintained (S7g).

The controller 300 switches the flow path with respect to the second switch valve V2 in such a manner that the fourth port V2a and the fifth port V2b are open and that the sixth port V2c is partly open (S7h).

At this point, the degree of opening to which the 8-eighth port V3b is partly open ranges from 5 to 30%.

Accordingly, the fuel-to-air mixture and the recirculation exhaust gas to which the first-level pressure is primarily applied by the first turbocharger 251 and which are thus discharged are guided to the second turbocharger 252 through the connection pipe 253. The second impeller 252a secondarily applies the second-level pressure to the fuel-to-air mixture and the recirculation exhaust gas, and then the resulting fuel-to-air mixture and the resulting recirculation exhaust gas are guided to the engine 210.

When the switching of the flow path with respect to the second switch valve V2 is completed, the controller 300 maintains the current operational condition and causes the engine 210 to operate in the normal state (S8).

Accordingly, from the above-described technical configurations of the embodiments of the present disclosure, it would be apparent to a person of ordinary skill to which the present disclosure pertains that specific embodiments other than the above-described embodiment of the present disclosure will be implemented without departing the technical idea and necessary features of the present disclosure.

Therefore, it should be understood that the above-described embodiments are illustrative and non-restrictive in all respects. The scope of the present disclosure is defined in the following claims rather than the detailed description provided above. All alterations, modifications, and the like that are derived from the following claims and equivalents thereof should be interpreted as being included within the scope of the present disclosure.

What is claimed is:

1. A gas heat-pump system comprising:
an air conditioning module comprising a compressor, an outdoor heat exchanger, an expansion device, an indoor heat exchanger, and a refrigerant pipe;
an engine module comprising an engine configured to burn a fuel-to-air mixture, and to generate a driving force of the compressor, and a turbocharger comprising a first turbocharger having a first impeller to be driven by a first motor and a second turbocharger having a second impeller to be driven by a second motor;
a mixture device configured to guide the fuel-to-air mixture to the turbocharger;
a connection pipe connecting a discharge port of the first turbocharger and an inlet port of the second turbocharger to each other for a fluid flow, the mixture device being connected to the connection pipe at a first position of the connection pipe between the discharge port of the first turbocharger and the inlet port of the second turbocharger;
an exhaust pipe configured to guide exhaust gas discharged from the engine to the outside;
a first bypass pipe connecting the exhaust pipe and the first turbocharger to each other for the fluid flow and configured to at least partly guide the exhaust gas to the first turbocharger; and
a second bypass pipe having a first end portion is connected to the exhaust pipe downstream from the position of the exhaust pipe where the first bypass pipe is connected to the exhaust pipe and having a second end portion connected to the connection pipe at a second position of the connection pipe, the second position of the connection pipe being between the first position of the connection pipe and a third position of the connection pipe where the connection pipe connects to the discharge port of the first turbocharger,
wherein the turbocharger supplies the fuel-to-air mixture to the engine by applying pressure with the second impeller, or supplies the fuel-to-air mixture to the engine by applying pressure with the first impeller and subsequently applying pressure with the second impeller.

2. The gas heat-pump system of claim 1, further comprising:
a first turbocharger entrance pipe connected to the mixture device upstream from a position where the connection pipe is connected to the mixture device and configured to guide the fuel-to-air mixture to a first inlet port of the first turbocharger; and
a first switch valve arranged at a position where the first turbocharger entrance pipe is connected to the mixture device, the first switch valve being configured to switch a flowing direction of the fuel-to-air mixture flowing within the mixture device.

3. The gas heat-pump system of claim 2, wherein the first switch valve comprises:
a first port connected to the mixture device;
a second port connected to the mixture device in a manner that faces the first port; and
a third port connected to the first turbocharger entrance port.

4. The gas heat-pump system of claim 3, further comprising:
a second switch valve arranged at a position where the first bypass pipe is connected to the exhaust pipe, the second switch valve configured to allow or block the fluid flow between the first bypass pipe and the exhaust pipe;
a third switch valve arranged at a position where the second bypass pipe and the connection pipe are connected to each other, the third switch valve configured to allow or block the fluid flow between the second bypass pipe and the connection pipe, wherein the second switch valve comprises:
a fourth port connected to the exhaust pipe;
a fifth port connected to the exhaust pipe in a manner that faces the fourth port; and
a sixth port connected to the first bypass pipe, and
the third switch valve comprises:
a seventh port connected to the connection pipe;
an eighth port connected to the connection pipe in a manner that faces the seventh port; and
a ninth port connected to the second bypass pipe.

5. The gas heat-pump system of claim 4, further comprising:
a controller configured to adjust an output rpm of the engine in a manner that corresponds to a required load ratio of the air conditioning module,
wherein when it is determined that the required load ratio is less than a first reference load ratio, the controller performs control in such a manner that the turbocharger operates in a first turbocharger operation mode,
when it is determined that the required load ratio is equal to or greater than the first reference load ratio and is less than a second reference load ratio, the controller performs control in such a manner that the turbocharger operates in a second turbocharger operation mode, and
when it is determined that the required load ratio is equal to or greater than the second reference load ratio, the controller performs control in such a manner that the turbocharger operates in a third turbocharger operation mode,
wherein the second reference load ratio is greater than the first reference load ratio.

6. The gas heat-pump system of claim 5, wherein the first reference load ratio is 30% of a maximum amount of load on the air conditioning module, and the second reference load ratio is 70% of the maximum amount of load.

7. The gas heat-pump system of claim 5, wherein in the first turbocharger operation mode, the controller sets a flow path with respect to the first switch valve in such a manner that the first port and the second port are open and that the third port is closed, sets the flow path with respect to the second switch valve in such a manner that the fourth port and the fifth port are open and that the sixth port is closed, and sets the flow path with respect to the third switch valve in such a manner that at least two of the seventh port, the eighth port, and the ninth port are closed.

8. The gas heat-pump system of claim 7, wherein in the first turbocharger operation mode, the controller supplies electric power to the second motor and thus rotates the second impeller, and blocks the electric power from being supplied to the first motor and thus stops the first impeller.

9. The gas heat-pump system of claim 8, wherein while operation in the first turbocharger operation mode is in progress, the controller determines whether or not the output rpm of the engine reaches a target rpm corresponding to the required load ratio, and when it is determined that the output rpm of the engine reaches the target rpm, the controller performs control in such a manner that the exhaust gas is at least partly introduced into the engine.

10. The gas heat-pump system of claim 9, wherein in order to at least partly introduce the exhaust gas into the engine, the controller maintains the flow path with respect to the first switch valve, switches the flow path with respect to the second switch valve in such a manner that the fourth port and the fifth port are open and that the sixth port is partly open, and switches the flow path with respect to the third switch valve in such a manner that the seventh port and the eighth port are open and that the ninth port is closed.

11. The gas heat-pump system of claim 10, wherein a degree of opening to which the sixth port is partly open ranges from 5% to 30%.

12. The gas heat-pump system of claim 5, in the second turbocharger operation mode, the controller sets the flow path with respect to the first switch valve in such a manner that the first port and the second port are open and that the third port is closed, sets the flow path with respect to the second switch valve in such a manner that the fourth port and the sixth port are open and that the fifth port is closed, and sets the flow path with respect to the third switch valve in such a manner that the seventh port and the ninth port are open and that the eighth port is closed.

13. The gas heat-pump system of claim 12, wherein in the second turbocharger operation mode, the controller supplies electric power to the first motor and the second motor and thus rotates the first impeller and the second impeller.

14. The gas heat-pump system of claim 13, wherein while operation in the second turbocharger operation mode is in progress, the controller determines whether or not the output rpm of the engine reaches a target rpm corresponding to the required load ratio, and when it is determined that the output rpm of the engine reaches the target rpm, the controller performs control in such a manner that the exhaust gas is at least partly introduced into the engine.

15. The gas heat-pump system of claim 14, wherein in order to at least partly introduce the exhaust gas into the engine, the controller maintains the settings of the flow paths with respect to the first switch valve and the second switch valve, and switches the flow path with respect to the third switch valve in such a manner that the seventh port and the ninth port are open and that the eighth port is partly open.

16. The gas heat-pump system of claim 15, wherein a degree of opening to which the eighth port is partly open ranges from 5% to 30%.

17. The gas heat-pump system of claim 5, in the third turbocharger operation mode, the controller sets a flow path with respect to the first switch valve in such a manner that the first port and the third port are open and that the second port is closed, sets the flow path with respect to the second switch valve in such a manner that the fourth port and the fifth port are open and that the sixth port is closed, and sets the flow path with respect to the third switch valve in such a manner that the seventh port and the eighth port are open and that the ninth port is closed.

18. The gas heat-pump system of claim 17, wherein in the third turbocharger operation mode, the controller supplies electric power to the first motor and the second motor and thus rotates the first impeller and the second impeller.

19. The gas heat-pump system of claim 18, wherein while operation in the third turbocharger operation mode is in progress, the controller determines whether or not the output rpm of the engine reaches a target rpm corresponding to the required load ratio, and when it is determined that the output rpm of the engine reaches the target rpm, the controller performs control in such a manner that the exhaust gas is at least partly introduced into the engine.

20. The gas heat-pump system of claim 14, wherein in order to at least partly introduce the exhaust gas into the engine, the controller maintains the settings of the flow path with respect to the first switch valve and the third switch valve, and switches the flow path with respect to the second switch valve in such a manner that the fourth port and the fifth port are open and the sixth port is partly open.

21. The gas heat-pump system of claim 20, wherein a degree of opening to which the sixth port is partly open ranges from 5% to 30%.

* * * * *